US010248201B2

(12) United States Patent
Hawkes et al.

(10) Patent No.: US 10,248,201 B2
(45) Date of Patent: Apr. 2, 2019

(54) WOLVERINE: A WEARABLE HAPTIC INTERFACE FOR GRASPING IN VIRTUAL REALITY

(71) Applicant: The Board of Trustees of the Leland Stanford Junior University, Stanford, CA (US)

(72) Inventors: Elliot W. Hawkes, Tallahassee, FL (US); Inrak Choi, Stanford, CA (US); Sean Follmer, San Francisco, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 0 days.

(21) Appl. No.: 15/588,507

(22) Filed: May 5, 2017

(65) Prior Publication Data
US 2017/0322626 A1    Nov. 9, 2017

Related U.S. Application Data

(60) Provisional application No. 62/332,885, filed on May 6, 2016.

(51) Int. Cl.
*G06F 3/01* (2006.01)
*A63F 13/28* (2014.01)

(52) U.S. Cl.
CPC ............. *G06F 3/014* (2013.01); *A63F 13/28* (2014.09); *G06F 3/016* (2013.01); *A63F 2300/8082* (2013.01)

(58) Field of Classification Search
CPC . G06F 3/01; G06F 3/014; G06F 3/016; A63F 13/28

USPC .............. 345/156–184, 424; 715/850; 43/23; 1/1; 74/490.06
See application file for complete search history.

(56) References Cited

U.S. PATENT DOCUMENTS

| | | | | |
|---|---|---|---|---|
| 2,149,837 | A * | 3/1939 | Browne | A01K 87/08 43/23 |
| 5,441,494 | A * | 8/1995 | Ortiz | B25J 3/00 294/213 |
| 6,113,395 | A * | 9/2000 | Hon | G09B 23/28 434/262 |
| 6,413,229 | B1 * | 7/2002 | Kramer | A61B 5/225 600/595 |
| 7,138,976 | B1 * | 11/2006 | Bouzit | G06F 3/014 345/156 |
| RE40,891 | E * | 9/2009 | Yasutake | G06F 3/0338 178/18.01 |

(Continued)

OTHER PUBLICATIONS

CyberGlove Systems—CyberGrasp®, http://www.cyberglovesystems.com/cybergrasp/; Version submitted herewith © 2009 CyberGlove Systems LLC, printed on May 25, 2017.

(Continued)

*Primary Examiner* — Prabodh M Dharia
(74) *Attorney, Agent, or Firm* — Knobbe, Martens, Olson & Bear, LLP

(57) ABSTRACT

A mobile, wearable haptic device (the Wolverine) designed for simulating the grasping of objects in a virtual reality interface is disclosed. The Wolverine renders a force directly between the thumb and at least one finger to simulate opposition type grasps of the objects. Mechanical design, control strategy, and performance analysis of the Wolverine system are disclosed.

23 Claims, 13 Drawing Sheets

(56) References Cited

U.S. PATENT DOCUMENTS

| | | | | |
|---|---|---|---|---|
| 8,177,856 | B2* | 5/2012 | Jaworski | A61F 2/586 623/64 |
| 8,540,656 | B1* | 9/2013 | Powlan | A61F 5/3761 602/32 |
| 2004/0145563 | A9* | 7/2004 | Rosenberg | A63F 13/06 345/156 |
| 2005/0177054 | A1* | 8/2005 | Yi | A61B 5/055 600/510 |
| 2006/0119578 | A1* | 6/2006 | Kesavadas | G06F 3/014 345/161 |
| 2006/0132433 | A1* | 6/2006 | Kramer | G06F 3/016 345/156 |
| 2008/0046226 | A1* | 2/2008 | Massie | B25J 9/1689 703/18 |
| 2008/0274769 | A1* | 11/2008 | Linden | G09B 5/00 455/556.1 |
| 2009/0229398 | A1* | 9/2009 | Vargas | B25J 9/0006 74/490.06 |
| 2011/0032187 | A1* | 2/2011 | Kramer | G06F 3/016 345/163 |
| 2011/0137727 | A1* | 6/2011 | Chung | G06F 3/0346 705/14.55 |
| 2011/0261083 | A1* | 10/2011 | Wilson | G06F 3/016 345/676 |
| 2012/0010749 | A1* | 1/2012 | van der Merwe | A61F 2/54 700/264 |
| 2012/0041295 | A1* | 2/2012 | Schultz | A61B 5/042 600/381 |
| 2012/0059298 | A1* | 3/2012 | Hoffman | A61F 5/013 602/21 |
| 2013/0193704 | A1* | 8/2013 | Ihrke | B25J 9/104 294/213 |
| 2014/0104274 | A1* | 4/2014 | Hilliges | G06F 3/011 345/424 |
| 2014/0125577 | A1* | 5/2014 | Hoang | G06F 3/017 345/156 |
| 2014/0184496 | A1* | 7/2014 | Gribetz | G02B 27/017 345/156 |
| 2015/0331576 | A1* | 11/2015 | Piya | G06F 3/011 715/850 |
| 2016/0259417 | A1* | 9/2016 | Gu | G06F 3/016 |
| 2017/0235364 | A1* | 8/2017 | Nakamura | G06F 3/016 345/156 |
| 2017/0266075 | A1* | 9/2017 | Becchi | A61H 1/0288 |
| 2017/0296363 | A1* | 10/2017 | Yetkin | A61F 2/72 |
| 2017/0322629 | A1* | 11/2017 | Pirasmepulkul | G06F 3/014 |
| 2017/0329488 | A1* | 11/2017 | Welker | G06F 3/04815 |
| 2018/0126265 | A1* | 5/2018 | Alghooneh | G08B 6/00 |
| 2018/0168907 | A1* | 6/2018 | Huang | A61H 1/0285 |

OTHER PUBLICATIONS

Cybergrasp—CyberGlove Systems LLC, http://www.cyberglovesystems.com/cybergrasp; Version submitted herewith © 2017 CyberGlove Systems Inc., printed on May 25, 2017.

Blake, J. et al., "Haptic glove with mr brakes for virtual reality," IEEE/ASME Transactions on Mechatronics, vol. 14, No. 5, pp. 606-615; Oct. 2009.

Bouzit, M. et al., "The rutgers master ii-new design force-feedback glove," IEEE/ASME Transactions on Mechatronics, vol. 7, No. 2, pp. 256-263; 2002.

Calli, B. et al., "Benchmarking in manipulation research: The YCB Object and Model Set and benchmarking protocols," arXiv preprint arXiv:1502.03143, 2015.

Choi, I. et al., "Wolverine: A Wearable Haptic Interface for Grasping in Virtual Reality." IEEE, 2016.

Cutkosky, M.R., "On grasp choice, grasp models, and the design of hands for manufacturing tasks," IEEE Transactions on Robotics and Automation, vol. 5, No. 3, pp. 269-279; 1989.

Doxon, A.J. et al., "Human detection and discrimination of tactile repeatability, mechanical backlash, and temporal delay in a combined tactile-kinesthetic haptic display system," IEEE Transactions on Haptics, vol. 6, No. 4, pp. 453-463; 2013.

Endo, T. et al., "Five-fingered haptic interface robot: Hiro iii," IEEE Transactions on Haptics, vol. 4, No. 1, pp. 14-27, 2011.

Endo, T. et al., Human Perception Test of Discontinuous Force and a Trial of Skill Transfer Using a Five-Fingered Haptic Interface, Journal of Robotics, vol. 2010, Article ID 542360, 14 pages.

Feix, T. et al., "The grasp taxonomy of human grasp types," IEEE Transactions on Human-Machine Systems, vol. 46, No. 1, pp. 66-77; 2015.

Gao, D. et al., "Steerability in planar dissipative passive robots," The International Journal of Robotics Research, vol. 29, No. 4, pp. 353-366; Apr. 2010.

Hirata, Y. et al., "Wire-type human support system controlled by servo brakes," IEEE/RSJ International Conference on Intelligent Robots and Systems, Vilamoura, Algarve, Portugal, pp. 3356-3361; Oct. 7-12, 2012.

Ho, C.H. et al., "Human haptic discrimination of thickness," MIT, pp. 1-82; 1996.

Jiang, L., "Portable haptic feedback for training and rehabilitation," Doctor of Philosophy Dissertation, Stanford University; Mar. 2009.

Koyama, T. et al., "Multi-fingered exoskeleton haptic device using passive force feedback for dexterous teleoperation," IEEE, vol. 3, pp. 2905-2910; 2002.

Koyanagi, K. et al., "Development of vr-stef system with force display glove system," ICAT, pp. 91-97; 2005.

Lee, Y. et al., "Wearable haptic glove using micro hydraulic system for control of construction robot system with vr environment," Proceedings of IEEE International Conference on Multisensor Fusion and Integration for Intelligent Systems, Seoul, Korea, pp. 638-643; Aug. 20-22, 2008.

Massie, T.H. et al., "The phantom haptic interface: A device for probing virtual objects," SensAble Technologies: ASME Paper, vol. 55, No. 1., pp. 295-300; 1994.

Matsuoka, Y. et al., "Design of life-size haptic environments," Experimental Robotics VII, vol. 271, pp. 461-470; 2001.

Nam, Y. J. et al., "Smart glove: hand master using magnetorheological fluid actuators," ICMIT, vol. 6794; 679434; 2007.

Ruspini, D.C. et al., "The haptic display of complex graphical environments," SIGGRAPH, vol. 97, pp. 345-352; 1997.

Salisbury, K. et al., "Haptic rendering: Programming touch interaction with virtual objects," ACM, pp. 123-130; 1995.

Sato, M., "Development of string-based force display: Spidar," Citeseer, pp. 1-6; 2002.

Simon, T. M. et al., "Wearable jamming mitten for virtual environment haptics," ISWC'14, pp. 67-70; 2014.

Swanson, A.B. et al., "The Strength of the Hand," Bulletin of Prosthetics Research, vol. 10, No. 14, pp. 145-153; 1970.

Tan, H. Z. et al., "Manual resolution of length, force, and compliance," Advances in Robotics, vol. 42, pp. 13-18; 1992.

Turner, M. et al., "Preliminary tests of an arm-grounded haptic feedback device in telemanipulation," in Proc. of the ASME Dynamic Systems and Control Division, vol. 64, pp. 145-149; 1998.

Video of operation of the Wolverine: http://shape.stanford.edu/research/wolverine/; Original publication date 2016; Version submitted herewith printed on May 25, 2017.

Vogels, I.M.L.C. et al., "Detection of temporal delays in visual-haptic interfaces," Human factors: The journal of the Human Factors and Ergonomics society, vol. 46, No. 1, pp. 118-134; Spring 2004.

Winter, S.H. et al., "Use of magnetorheological fluid in a force feedback glove," IEEE Transactions on Neural Systems and Rehabilitation Engineering, vol. 15, No. 1, pp. 2-8; 2007.

Zhang, R. et al., "Dielectric elastomer spring roll actuators for a portable force feedback device," IEEE, 2006 14th Symposium on, pp. 347-353; 2006.

Zubrycki, I. et al., "Novel haptic glove-based interface using jamming principle," IEEE, Proceedings of the 10th International Workshop on Robot Motion and Control, Poznan University of Technology, Poznan, Poland, pp. 46-51; Jul. 6-8, 2015.

* cited by examiner

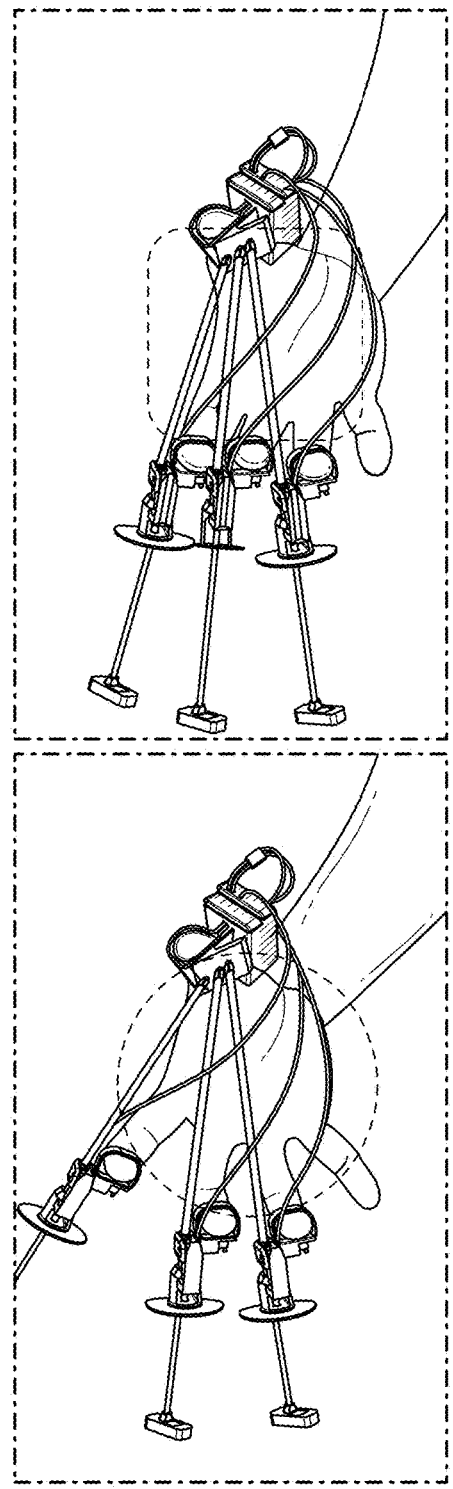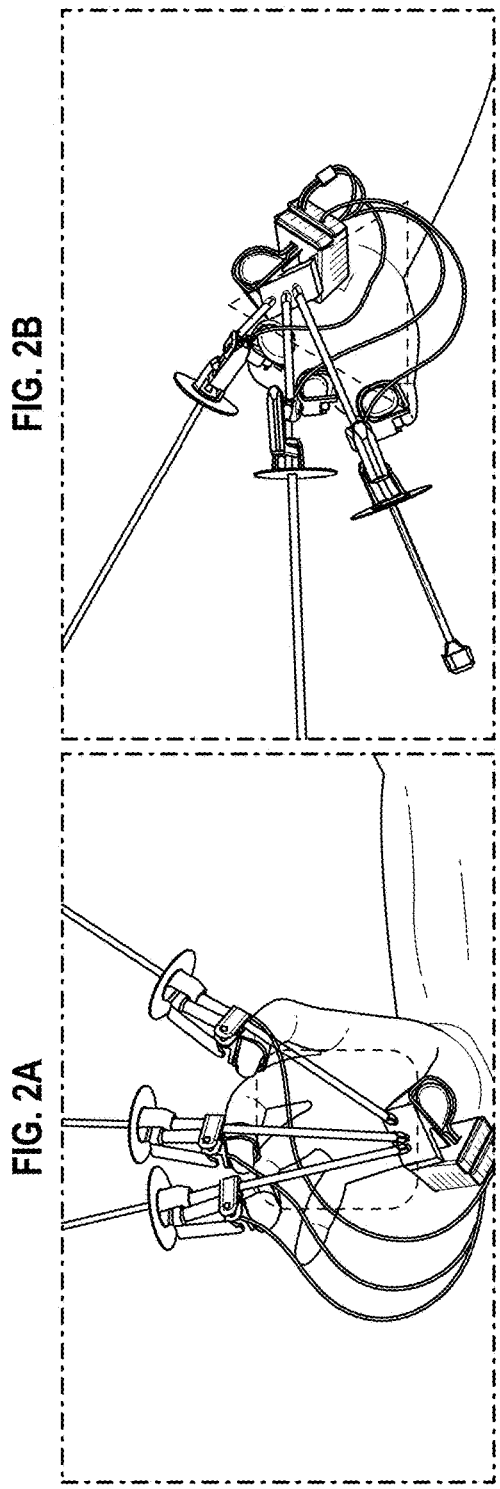
FIG. 2A
FIG. 2B
FIG. 2C
FIG. 2D

FIG. 4A – FIG. 4E
FIG. 4A
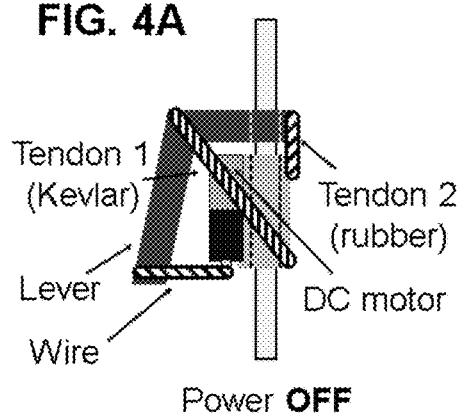
Power OFF
FIG. 4B
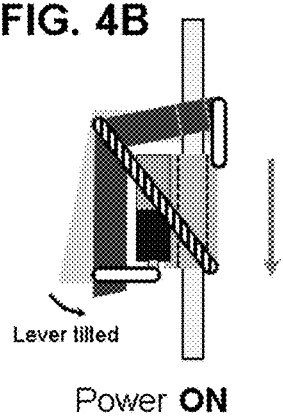
Power ON
FIG. 4C
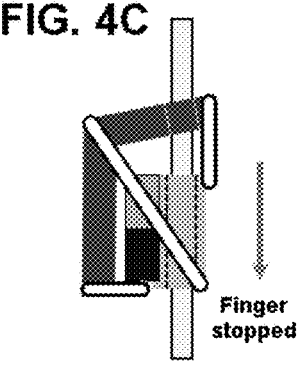
Power ON
FIG. 4D
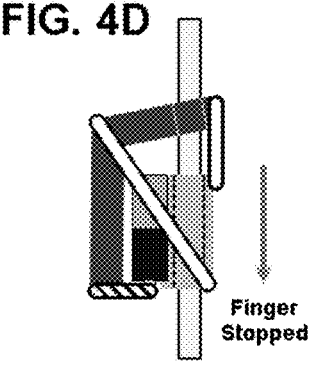
Power OFF
FIG. 4E
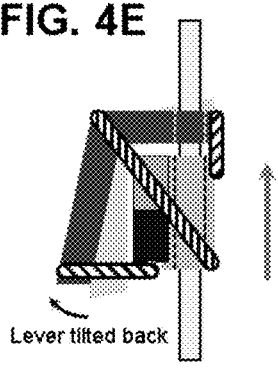
Power OFF
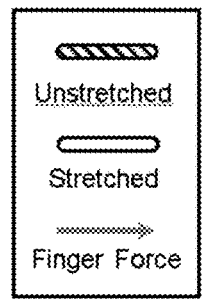

WOLVERINE: A WEARABLE HAPTIC INTERFACE FOR GRASPING IN VIRTUAL REALITY

PRIORITY AND CROSS REFERENCE TO RELATED APPLICATIONS

This application claims the benefit of U.S. Provisional Application No. 62/332,885, filed on May 6, 2016, which is hereby incorporated by reference in its entirety.

BACKGROUND

Field

The present disclosure relates to embodiments of a device that allow physical manipulation of virtual objects based on kinesthetic and haptic feedback.

Description of the Related Art

Though virtual reality (VR) has been explored in research contexts since the late 1950s, recent advances in display technology have made consumer VR a reality. While new devices such as the Oculus Rift or HTC Vive provide high resolution visuals, the user input devices have been limited to traditional game controllers and existing styles of gestural input.

SUMMARY

In some embodiments, a device for simulating a grasping by a hand of an object in a virtual environment is provided. In some embodiments, the device comprises a base, which mounts on the thumb of the hand, at least one connected rod comprising a sliding mount connected to at least one fingertip, wherein the sliding mount comprises a brake configured to lock onto the at least one connected rod, and an exoskeleton structure, which connects the thumb and the at least one fingertip.

In some embodiments of the device, the at least one connected rod is connected to the base by a ball joint with three degrees of freedom. In some embodiments of the device, the sliding mount is connected to the at least one connected rod by a cylindrical joint with two degrees of freedom. In some embodiments of the device, the at least one fingertip is connected to the sliding mount by a revolute joint with one degree of freedom. In some embodiments, the device comprises three connected rods. In some embodiments, the device is a mobile wearable haptic device. In some embodiments, the device comprises at least one geared dc motor and at least one battery.

In some embodiments, the total weight of the device ranges from about 4 gm to about 400 gm. In some embodiments, the device further comprises one or more sensors mounted on a tip of each connected rod to measure a position of the connected rod. In some embodiments of the device, the one or more sensors to measure a position of the connected rod is selected from the group consisting of Time-of-Flight sensor, optical encoder, magnetic encoder, linear variable differential transformer, and ultrasonic sensor. In some embodiments, the device further comprises one or more sensors coupled to the base to measure an overall orientation of the device. In some embodiments of the device, the one or more sensors to measure an overall orientation of the device is selected from the group consisting of a 9 axis inertial measurement unit (InvenSense MPU9250 with sensor fusion), 6 axis inertial measurement unit, hall effect sensor, optical encoder, and magnetic encoder.

In some embodiments, the device is configured to enable a user to grasp the object in the virtual environment in a precision-based grip by resisting a relative motion between the at least one fingertip and the thumb. In some embodiments, the device is configured to couple to one or more of a virtual reality headset, a controller, and a master controller. In some embodiments of the device, the coupling is via a wireless connection.

In some embodiments, a method for simulating a grasping by a hand of an object in a virtual environment is provided. In some embodiments, the method comprises installing a device comprising a base, which mounts on the thumb of the hand, at least one connected rod comprising a sliding mount connected to at least one fingertip, wherein the sliding mount comprises a brake configured to lock onto the at least one connected rod, and an exoskeleton structure, which connects the thumb and the at least one fingertip, and moving the hand comprising the installed device toward the object in the virtual environment, and grasping the object in the virtual environment, such that the device generates kinesthetic feedback thereby simulating a real world grasping sensation.

In some embodiments of the method, a force between the thumb and the at least one fingertip simulates a pad opposition type grasp/grip. In some embodiments of the method, the force ranges from about 0.05 N to about 500 N. In some embodiments of the method, a precision grasping motion is generated by the exoskeleton. In some embodiments of the method, a position of the connected rod is measured by one or more sensors. In some embodiments of the method, an orientation of the device is measured by one or more sensors.

In some embodiments of the method, the object is selected from the group consisting of the YCB Object and Model Set. In some embodiments of the method, a shape of the object is selected from the group consisting of tetrahedron, square pyramid, hexagonal pyramid, cube, cuboid, triangular prism, octahedron, pentagonal prism, hexagonal prism, dodecahedron, sphere, ellipsoid, icosahedron, cone and cylinder.

BRIEF DESCRIPTION OF THE DRAWINGS

FIG. 2A-FIG. 2D show embodiments of the Wolverine grasping various geometric shapes.

FIG. 2A shows an embodiment of the Wolverine grasping a spherical shape.

FIG. 2B shows an embodiment of the Wolverine grasping a large cubic shape.

FIG. 2C shows an embodiment of the Wolverine grasping a small cubic shape.

FIG. 2D shows an embodiment of the Wolverine grasping a pyramid shape.

FIG. 4A-FIG. 4E show the brake mechanism in a schematic of an embodiment of the Wolverine.

FIG. 4A shows that when the power is OFF, the lever is in the "out" position, and the hole in the lever through which the rod passes is aligned with the rod.

FIG. 4B shows that when the motor is powered ON, a wire is pulled, rotating the lever to the "in" position; the rod now jams in the hole in the lever.

FIG. 4C shows that as a load is applied by the user to the sliding mount, Tendon 1 becomes taut, further jamming the rod in the hole in the lever.

FIG. 4D shows that even when the power is turned OFF, the brake remains engaged due to tension in Tendon 1.

FIG. 4E shows that when the user releases the squeezing force, the elastic Tendon 2 pulls the lever back into the "out" position, and the sliding mount is free to move away from the thumb.

DETAILED DESCRIPTION

Figure 1A:
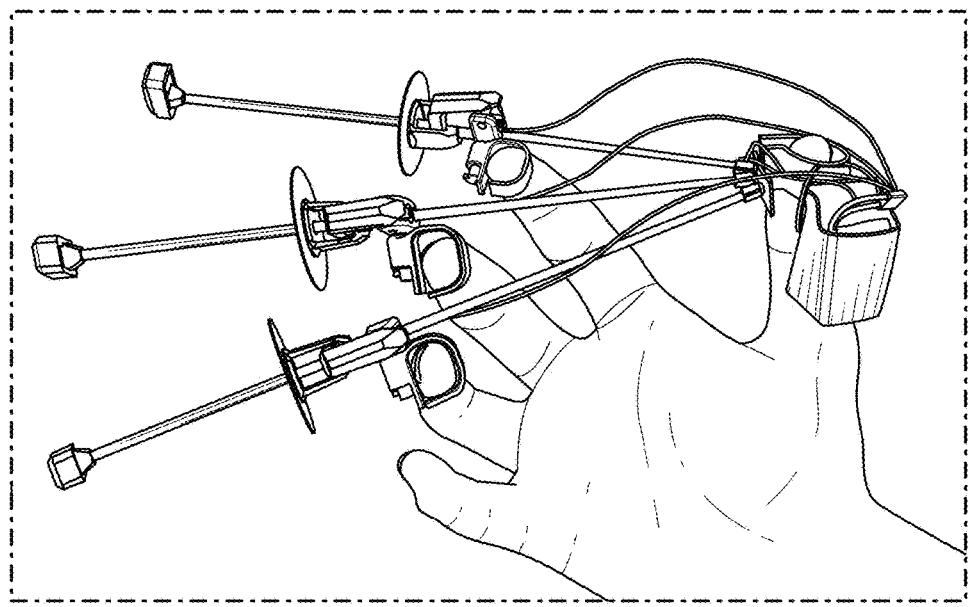
FIG. 1A shows an embodiment of the Wolverine, a novel wearable haptic user interface for grasping in virtual reality.

It is desirable to allow users to touch what they can see and physically manipulate virtual objects. However, current consumer input devices do not provide the kinesthetic feedback that is experienced when interacting with objects in the real world.

Ideally, haptic feedback interfaces for consumer VR should be low cost, lightweight, ungrounded, while still providing force feedback that realistically simulates touching and manipulating objects; that is, the interfaces should resist forces larger than finger strength at a high refresh rate with high accuracy. There have been a variety of approaches in the research literature that explore force feedback gloves: externally grounded systems [1], [2], systems grounded to the wrist [3], systems providing forces between the palm and fingers [4], and systems providing forces between the thumb and fingers [5]. However, none of these devices meets all of the above design objectives for consumer based devices.

Researchers have developed externally-grounded haptic interfaces with external actuation in order to make the manipulator light. The most popular haptic interface in this category is the PHANToM [1] which allows a user to feel stiffness and textures of virtual objects through a finger mounted end effector. HIRO [6] and SPIDAR [2] can also be included in this category. While previous research has investigated brake-based haptic interfaces, they primarily use passive force feedback with brakes for guidance in path following applications tasks [7], [8], [9]. These grounded haptic interfaces create various types of force feedback since the device is fixed on the ground, but the work envelope is limited to a small 3d space.

Researchers have also developed glove-style haptic interfaces to give users more degrees of freedom in motion. The first glove-style haptic interface, CyberGrasp [3], was launched commercially in early 1990s. Since then, there have been other exoskeleton force-feedback gloves developed using different mechanisms, such as passive spring and clutch force feedback devices [10], wire-driven devices [11], [12], magnetorheological fluid devices [13], [14], [15], and micro hydraulic systems [16]. These systems are grounded to back of the hand or wrist of the user. One limitation of such systems could be unexpected kinesthetic or tactile feedback at the contact area between the device and user's hand.

Other researchers have explored providing force directly between the fingers and the palm to simulate palm opposition type grasping, such as the Rutgers Master II (RMII) [4]. More recently, researchers have investigated the use of particle jamming to provide resistance between the fingers and palm [17], [18]. Devices that provide forces directly between the fingers and thumb to simulate pad opposition or precision type grips have also been developed. Zhang et al. explored lightweight electroactive polymer actuators between the thumb and forefingers (DESR), however it has a limited range of motion [5]. So far, researchers have focused on developing haptic gloves generating realistic stimuli of soft objects. As such they compromise on wearability and as they are often large and cumbersome.

The present disclosure seeks to meet these design objectives by providing embodiments of a device that is low cost, lightweight, ungrounded, while still providing force feedback that realistically simulates touching and manipulating objects. The present disclosure is related to embodiments of a device, interchangeably referred to herein as "the Wolverine system," "the system," "the device," or "the Wolverine" [30]. In some embodiments, the Wolverine comprises a brake mechanism for haptic sensation. In some embodiments, the Wolverine is mounted directly to the thumb and fingers. In some embodiments, the Wolverine is mounted directly to the thumb and fingers such that extra haptic sensation due to grounding are avoided. The embodiments of the device herein provides interfaces that resist forces larger than finger strength at a high refresh rate with high accuracy. In some embodiments, a specific case of grasping virtual rigid objects in precision-based grips is provided. In some embodiments, the focus is on supporting a wide range of motion in a lightweight, low-cost package; however, in order to achieve these goals, active force feedback and the ability to render variable stiffness are relatively compromised. In some embodiments, the Wolverine comprises a simple brake mechanism. In some embodiments, the Wolverine comprises a simple brake mechanism such that the device is significantly cheaper and lighter than previous and other similar devices.

Figure 1B:
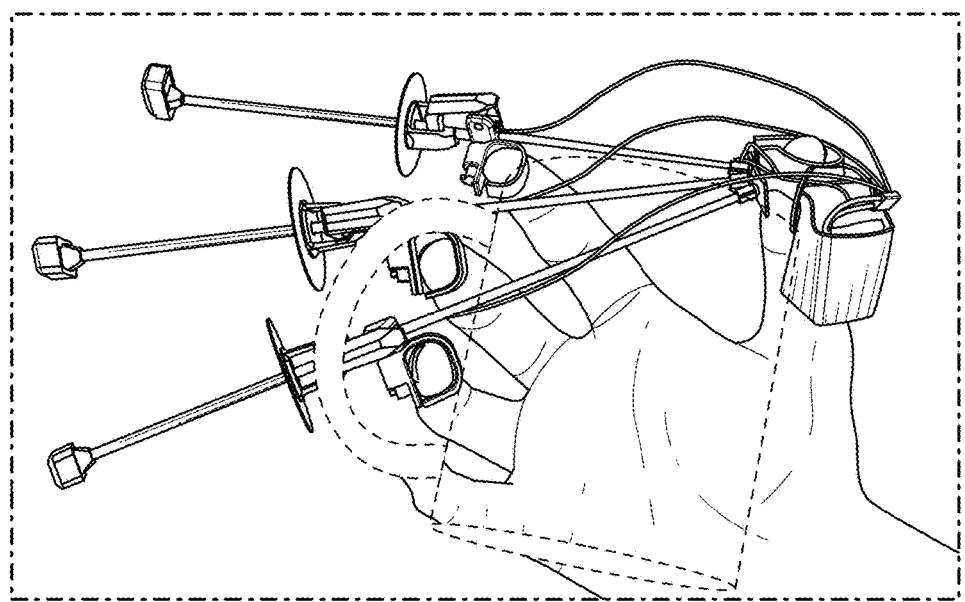
FIG. 1B shows an embodiment of the Wolverine holding a cylinder-shaped virtual object.

In some embodiments, the Wolverine (FIG. 1A) attaches to the tips of three fingers and the thumb. FIG. 1B illustrates an embodiments of the Wolverine grasping a cylindrical shape. FIG. 2A-FIG. 2D show embodiments of the Wolverine grasping other geometric shapes. Non-limiting examples include a spherical shape (FIG. 2A), a large cubic shape (FIG. 2B), a small cubic shape (FIG. 2C), and a pyramid shape (FIG. 2D). Non-limiting examples of other geometric shapes include small ball, large ball, small block, large block, arc, triangle, sphere, cylinder, plate, shell, rod, rice, fiber, wire, pyramid, prism, star, crescent, ring, tetrahedron, square pyramid, hexagonal pyramid, cube, cuboid, triangular prism, octahedron, pentagonal prism, hexagonal prism, dodecahedron, sphere, ellipsoid, icosahedron, cone, cylinder, etc. Ref [31] provides a video of operation of an embodiment of the Wolverine.

In some embodiments, the device provides the sensation of grasping an object by resisting relative motion between the fingers and thumb. In some embodiments, the device utilizes a brake-based system to provide high resistance to forces in a light-weight, low power, and low cost package. In some embodiments, the Wolverine can be integrated with one or more game controllers. In some embodiments, the Wolverine can be integrated with one or more VR headsets. In some embodiments, the Wolverine can be integrated with one or more game controllers and one or more VR headsets. In some embodiments, the Wolverine is applicable for various styles and means of gestural input and/or output. The present disclosure provides the Wolverine system's mechanical design, integrated sensing and control, and an analysis of its performance.

Overall Structure

The Wolverine is a mobile, wearable haptic device designed for simulating the grasping of objects in virtual environment. In contrast to prior work on force feedback gloves, the Wolverine is focused on creating a low cost, lightweight, and wireless device that renders a force directly between the thumb and three fingers to simulate objects held in pad opposition type grasps. In some embodiments, other opposition type grasps are also contemplated.

Figure 3:
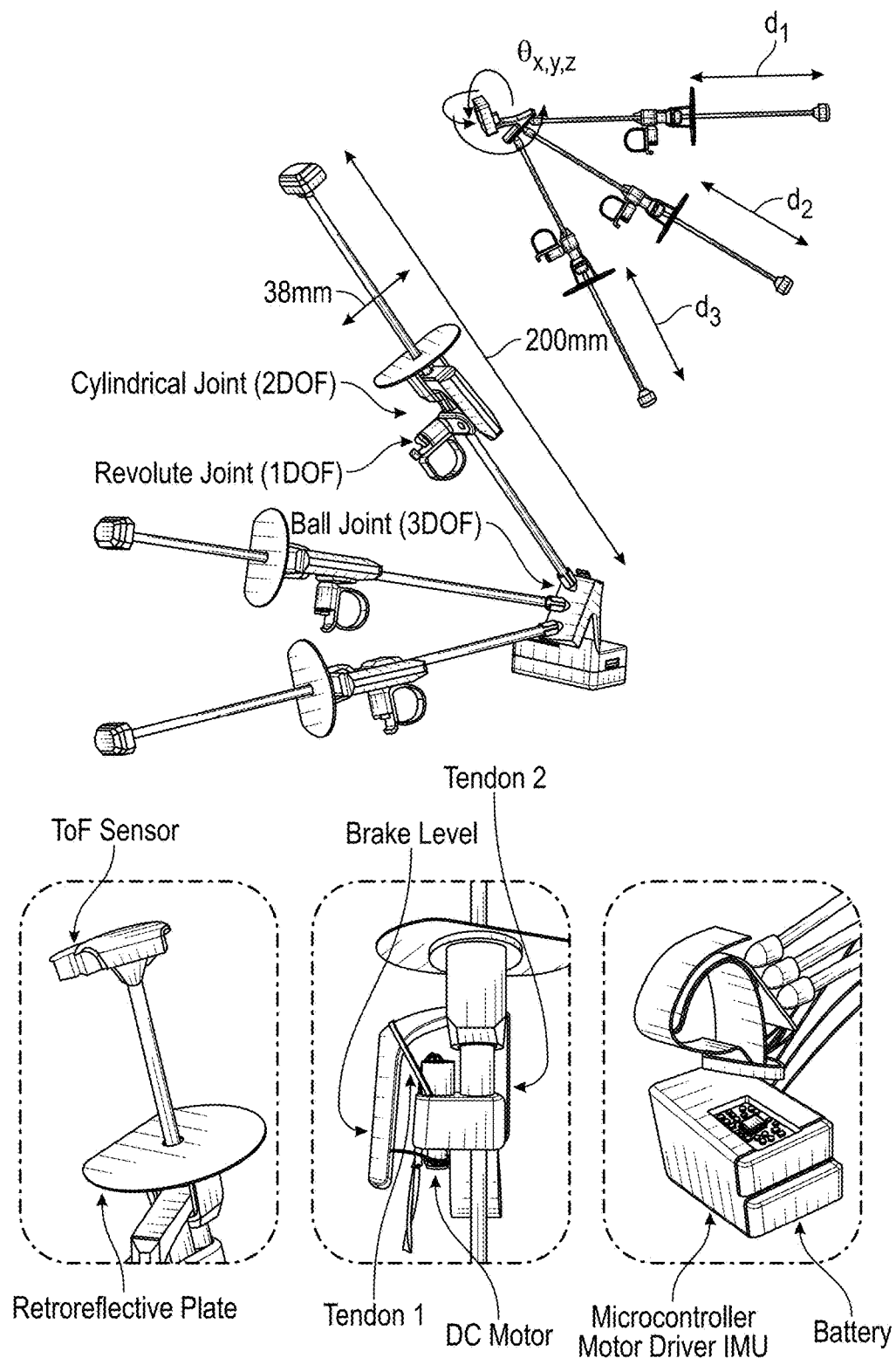
FIG. 3 shows an overview of an embodiment of the Wolverine system. Top right shows the sensing degrees of freedom, center left shows the motion degrees of freedom, and bottom shows close-up views of the individual components.

In some embodiments, the Wolverine is composed of a base, which mounts on the thumb, and three connected rods, each of which has a sliding mount for the tips of the index, middle, and ring fingers (FIG. 3). In some embodiments, the device comprises one connected rod with a sliding mount for the tip of the index, middle, or ring fingers. In some embodiments, the device comprises two connected rods with a sliding mount for the tips of the index, middle, and ring fingers. Each sliding mount has a brake that can lock onto the respective rod. Therefore, the three finger tips are physically connected to the thumb tip through an exoskeleton structure that can generate precision grasping motions [19], [20]. The rods are connected to the base with ball joints. Each ball joint has 3 degrees of freedom (FIG. 3, center). The sliding mounts are connected to the rods with cylindrical joints. Each cylindrical joint has 2 degrees of freedom (FIG. 3, center). The supporting structures physically in contact with the three finger tips are connected to the sliding mounts with revolute joints. Each revolute joint has 1 degree of freedom (FIG. 3, center). Due to its many degrees of freedom and low friction and inertia, this structure allows the hand to move freely. However, when it is desirable to create the feeling of grasping an object, brakes are actuated that lock the sliding mounts at desired locations on the rods. As a result, the kinesthetic force feedback that would be felt when gripping a rigid object is recreated.

In some embodiments, the weight of each actuator is about 5 gm. The weight of the actuator ranges from about 0.1 gm to about 10 gm. In some embodiments, the weight of the actuator is about 0.1, 0.5, 1, 2, 3, 4, 5, 6, 7, 8, 9 or 10, or within a range defined by any two of the aforementioned values. The total weight of the device, which includes the weight of 350 mAh battery, is about 55 gm. In some embodiments, the total weight of the device, including a 350 mAh battery, ranges from about 4 gm to about 400 gm. In some embodiments, the total weight of the device, including a 350 mAh battery, is about 4, 20, 40, 80, 120, 160, 200, 240, 280, 320, 360 or 400 gm, or within a range defined by any two of the aforementioned values. In some embodiments, the mAh of the battery is 350 mAh. In some embodiments, the mAh of the batteries ranges from about 50 mAh to about 1500 mAh. In some embodiments, the mAh of the batteries is about 50, 75, 100, 200, 250, 500, 750, 1000, 1250 or 1500 mAh, or within a range defined by any two of the aforementioned values. In some embodiments, the number of batteries is one. In some embodiments, the number of batteries ranges from one to about 30. In some embodiments, the number of batteries is about 1, 2, 3, 4, 5, 6, 7, 8, 9, 10, 15, 20, 25 or 30, or within a range defined by any two of the aforementioned values. Power is transmitted attached through a wire from the thumb mounted control board. The device is wireless and communicates with a master controller through a Bluetooth module. Other modes of wireless communication (e.g., infrared) are also contemplated. Thus, external cables do not impede arm motions and reduce realism in virtual reality applications.

Actuation

Previously described haptic gloves have active actuators for force feedback to generate variable stiffness. In contrast, in some embodiments, a brake mechanism is used to render virtual objects in order to make the Wolverine compact and energy efficient. In some embodiments, a brake system in general, guarantees stable motions because it can only dissipate energy, and is often more compact than active actuators of the same strength.

However, brake systems can only resist motion, which could lead to an unnatural grasping sensation if there is any resistance when the user opens his or her hand. Therefore, in some embodiments, a mechanism for directional braking in haptic applications is provided. As shown in FIG. 4A, in the default state with the actuation OFF, the lever is in the "out" position. The hole in the lever through which the rod passes is coaxial with the rod, allowing the sliding mount to move freely along the rod. In order to lock the sliding mount with respect to the rod, a 6 mm diameter 20:1 geared dc motor is turned ON and pulls a wire that rotates the lever counterclockwise taking roughly 20 ms. In some embodiments, the diameter ranges from about 3 mm to about 10 mm. In some embodiments, the diameter is about 3, 3.5, 4, 4.5, 5, 5.5, 6, 6.5, 7, 7.5, 8, 8.5, 9, 9.5 or 10 mm, or within a range defined by any two of the aforementioned values. In some embodiments, the counterclockwise rotation takes about 4 ms to about 40 ms. In some embodiments, the counterclockwise rotation is about 4, 5, 6, 7, 8, 12, 16, 20, 24, 28, 32, 36 or 40 ms, or within a range defined by any two of the aforementioned values. As a result, the hole through which the rod passes is no longer coaxial with the rod, and jamming occurs (FIG. 4B). In some embodiments, the voltage (in volts (V)) of the dc motor ranges from about 3.3 V to about 8.4 V. In some embodiments, the voltage of the dc motor is about 3, 3.5, 4, 4.5, 5, 5.5, 6, 6.5, 7, 7.5, 8, 8.5 or 9 V, or within a range defined by any two of the aforementioned values.

As the user applies a force pulling the sliding mount toward the thumb, Tendon 1 becomes taut, further rotating the lever counterclockwise, further jamming the rod in the hole in the lever (FIG. 4C). The controller then turns OFF the power, but the brake is still engaged due to tension in Tendon 1 (FIG. 4D). This stage can last as long as necessary to complete the desired task in virtual reality (e.g., grasping a virtual cylindrical object). Once the user finishes the task and opens his or her hand, the elastic Tendon 2 rotates the lever back clockwise into the "out" position, unlocking the braking mechanism, and the sliding mount is free to move away from the thumb (FIG. 4E). The user can freely move his or her finger away from the thumb.

It is important to note that the dc motors are only required for initiating braking (FIG. 4B and FIG. 4C). The dc motors are not required to maintain braking once the user is applying a force that pulls the sliding mount toward the thumb (FIG. 4D).

Active Brake Engagement

Figure 5:
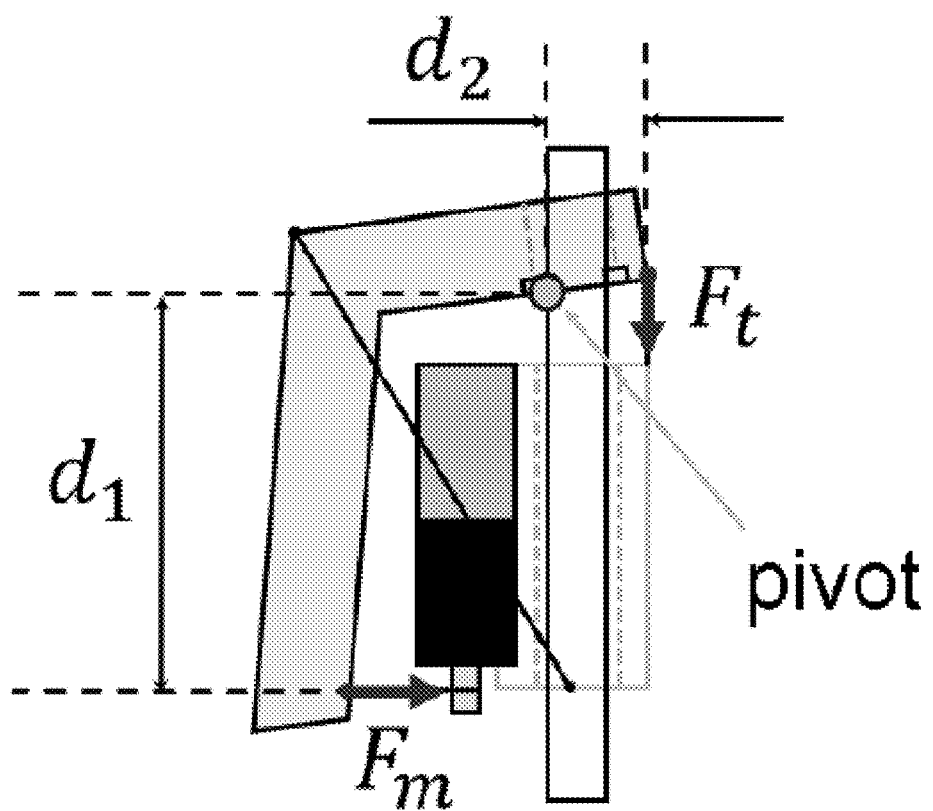
FIG. 5 shows a free body diagram of initial brake engagement in a schematic of an embodiment of the Wolverine.

In some embodiments, the active engagement of the brake is the heart of the device, governing both actuation speed and the accuracy of the output. Therefore, in some embodiments, instead of telescoping, the Wolverine comprises a rod that is positioned adjacent to a finger. In some embodiments, a brake is provided that operates as a clamp on the rod. It is therefore helpful to describe the parameters that determine active brake engagement performance. FIG. 5 shows a simple free body diagram of the brake lever, pivoting about its contact point. In some embodiments, the motor is the active element that engages the system, while Tendon 2 (labeled in FIG. 4A) provides the force that keeps the brake from jamming unintentionally. In some embodiments, Tendon 2 also passively back-drives the motor for release. For the sake of analysis, the static case of moment balances about the pivot according to the equation:

$$\Sigma M = d_1 F_m - d_2 F_t = 0 \quad (1)$$

where $d_1$ is the height of the lever, $F_m$ is the force of the motor, $d_2$ is the distance from the pivot to the spring and $F_t$ is the force of the spring. In some embodiments, $d_1$ ranges from about 3 mm to about 30 mm. In some embodiments, $d_1$ is about 3, 6, 9, 12, 15, 18, 21, 24, 27 or 30 mm, or within a range defined by any two of the aforementioned values. In some embodiments, $d_2$ ranges from about 1 mm to about 10 mm. In some embodiments, $d_2$ is about 1, 2, 3, 4, 5, 6, 7, 8, 9 or 10 mm, or within a range defined by any two of the aforementioned values. In some embodiments, $F_m$ ranges from about 0.1 N to about 1.5 N. In some embodiments, $F_m$ is about 0.1, 0.2, 0.3, 0.4, 0.5, 0.6, 0.7, 0.8, 0.9, 1, 1.1, 1.2, 1.3, 1.4 or 1.5 N, or within a range defined by any two of the aforementioned values. In some embodiments, $F_t$ ranges from about 0.1 N to about 1.5 N. In some embodiments, $F_t$ is about 0.1, 0.2, 0.3, 0.4, 0.5, 0.6, 0.7, 0.8, 0.9, 1, 1.1, 1.2, 1.3, 1.4 or 1.5 N, or within a range defined by any two of the aforementioned values The force from the tendon spring ($F_t$) and the force from the motor ($F_m$) are modeled by:

$$F_t = k_t * (l_f - l_i) \& F_m = T_m / r_m \quad (2)$$

where $k_t$ is the spring constant, and $l_f$ and $l_i$ are the final and initial tendon spring lengths, respectively, $T_m$ is the motor drive torque and $r_m$ is the motor pulley radius. In some embodiments, $k_t$ ranges from about 0.1 N/m to about 1000000 N/m. In some embodiments, $k_t$ is about 0.1, 1, 5, 10, 50, 100, 500, 1000, 5000, 10000, 50000, 100000, 500000, or 1000000 N/m, or within a range defined by any two of the aforementioned values. In some embodiments, $l_f$ ranges from about 3 mm to about 30 mm. In some embodiments, $l_f$ is about 3, 6, 9, 12, 15, 18, 21, 24, 27 or 30 mm, or within a range defined by any two of the aforementioned values. In some embodiments, $l_i$ ranges from about 2 mm to about 20 mm. In some embodiments, $l_i$ is about 2, 4, 6, 8, 10, 12, 14, 16, 18 or 20 mm, or within a range defined by any two of the aforementioned values. In some embodiments, $T_m$ ranges from about 0.1 mNm to about 10 mNm. In some embodiments, $T_m$ ranges is about 0.1, 0.25, 0.5, 1, 2, 3, 4, 5, 6, 7, 8, 9 or 10 mNm, or within a range defined by any two of the aforementioned values. In some embodiments, $r_m$ ranges from about 0.2 mm to about 2 mm. In some embodiments, $r_m$ is about 0.2, 0.3, 0.4, 0.5, 0.6, 0.7, 0.8, 0.9, 1, 1.2, 1.4, 1.6, 1.8 or about 2 mm, or within a range defined by any two of the aforementioned values.

Using the Equations 1 and 2, the minimum motor torque necessary to engage the brake can be calculated as follows:

$$T_{m\_min} = d_2 r_m k (l_f - l_i) / d_1 \quad (3)$$

The minimum tendon spring tension required to back-drive the motor is governed by:

$$F_{t\_min} = r_m T_{backdrive} \quad (4)$$

where $T_{backdrive}$ is the torque required to backdrive the motor. In some embodiments, $T_{m\_min}$ ranges from about 0.1 mNm to about 10 mNm. In some embodiments, $T_{m\_min}$ is about 0.1, 0.25, 0.5, 1, 2, 3, 4, 5, 6, 7, 8, 9 or 10 mNm, or within a range defined by any two of the aforementioned values. In some embodiments, $F_{t\_min}$ ranges from about 0.01 N to about 0.5 N. In some embodiments, $F_{t\_min}$ ranges from about 0.01, 0.025, 0.05, 0.075, 0.1, 0.15, 0.2, 0.25, 0.3, 0.35, 0.4, 0.45 or 0.5 N, or within a range defined by any two of the aforementioned values. In some embodiments, $T_{backdrive}$ ranges from about 0.1 mNm to about 10 mNm. In some embodiments, $T_{backdrive}$ is about 0.1, 0.25, 0.5, 1, 2, 3, 4, 5, 6, 7, 8, 9 or 10 mNm, or within a range defined by any two of the aforementioned values.

As the forward motor torque depends on the spring force, and the spring force depends on motor backdrivability, the ratio of forward motor torque to backdrivable motor torque is important. Thus, in some embodiments, a motor with a relatively small gear ratio (20:1) is provided. In some embodiments, the gear ratio ranges from about 1:1 to about 700:1. In some embodiments, the gear ratio is about 1:1, 5:1, 10:1, 25:1, 50:1, 75:1, 100:1, 150:1, 200:1, 250:1, 300:1, 350:1, 400:1, 450:1, 500:1, 550:1, 600:1, 650:1 or 700:1 or within a range defined by any two of the aforementioned values. In some embodiments, the motor is actively reversed for a short duration to eliminate the issue of the ratio of forward motor torque to backdrivable motor torque. In some embodiments, the motor is actively reversed for about 4 ms to about 40 ms. In some embodiments, the motor is actively reversed for about 4, 8, 12, 16, 20, 24, 28, 32, 36 or 40 ms, or within a range defined by any two of the aforementioned values.

Figure 7:
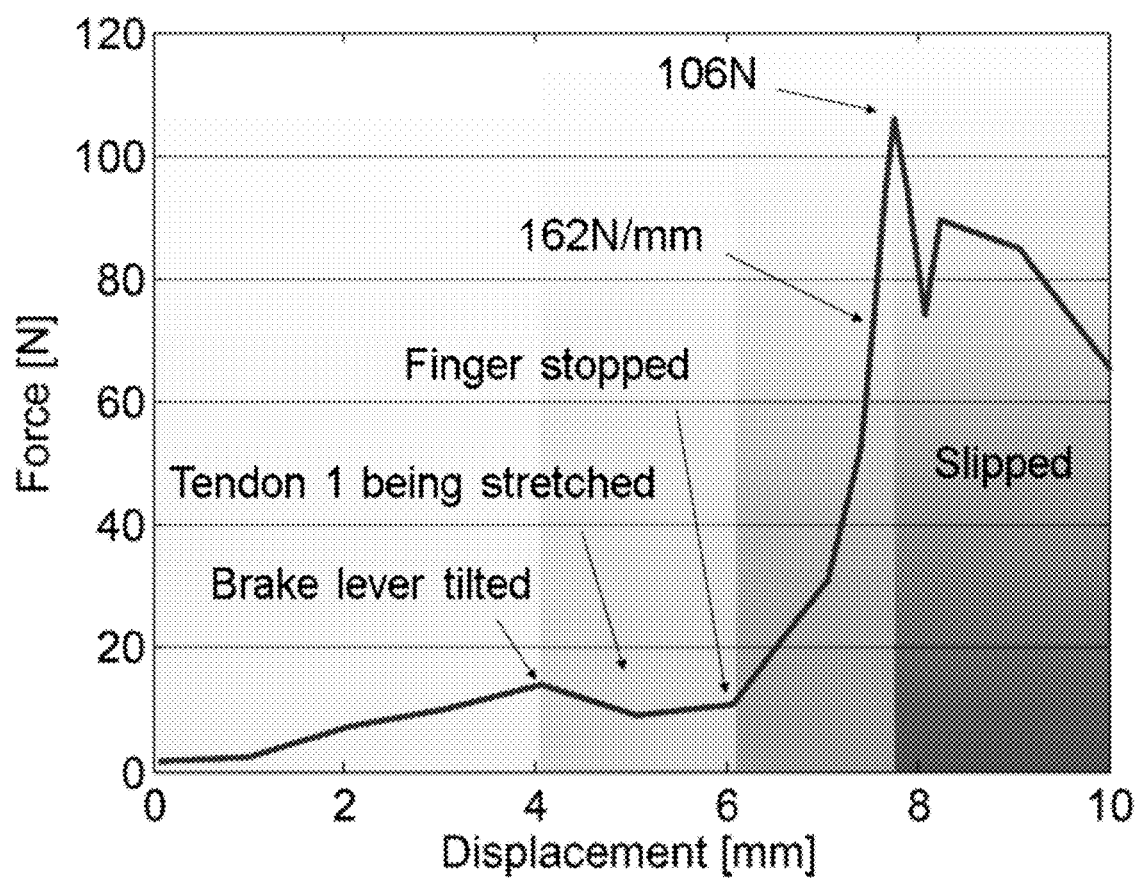
FIG. 7 shows data related to force—displacement curve of the brake mechanism as measured by Instron 5848 for an embodiment of the Wolverine.

FIG. 7 shows a force-displacement curve for characterizing the stiffness and maximum force of an embodiment of the Wolverine. In some embodiments, a current force level of over 100 N is suitable because it is larger than the forces generated from precision grasps. Previous work related to grasping describes the average strength of chuck pinch as 7.9 kg (77.4 N) for men, and 5.2 kg (51.0 N) for women [25]. While other devices are able to render more complex force profiles, their maximum forces are substantially lower ranging from 5 N-29 N [4], [5], [11], [14], [16], [26], making them more suitable to delicate tasks. In some embodiments, the stiffness during braking is about 162 N/mm. In some embodiments, the stiffness during braking ranges from about 0.1 N/mm to about 1000 N/mm. In some embodiments, the stiffness during braking is about 0.1, 0.5, 1, 5, 10, 50, 100, 150, 200, 250, 300, 350, 400, 450, 500, 750, or 1000 N/mm, or within a range defined by any two of the aforementioned values.

In some embodiments, the device comprises a jamming brake. In some embodiments, the jamming brake fails when the maximum force reaches a certain threshold. In some embodiments, the maximum force before failure of the jamming break is about 106 N. In some embodiments, the maximum force can be set to allow slippage (or failure of the jamming brake) to emulate any object to be grasped in the virtual environment. For example, in some embodiments, the maximum force can be set to intentionally allow slippage to emulate a soft, plastically deforming object. In some embodiments, the slipping force (or the maximum force before failure of the jamming brake) is as low as 0.05 N or as high as about 500 N. In some embodiments, the slipping force (or the maximum force before failure of the jamming brake) is about 0.05, 0.1, 1, 5, 10, 50, 100, 150, 200, 250, 300, 350, 400, 450 or 500 N, or within a range defined by any two of the aforementioned values. The brake force is a frictional force between the carbon fiber rod and an aluminum flat washer affixed to the lever. In some embodiments, the rod can be made of other materials. Non-limiting examples include fiberglass, ABS, PET, PVC, aluminum, stainless steel, and titanium. In some embodiments, the washer can be made of other materials. Non-limiting examples include ABS, PET, PVC, stainless still, brass, and titanium. In some embodiments, a more detailed brake system design and position sensors could be provided for better performance of the Wolverine.

Sensing

In some embodiments, sensors are integrated into the Wolverine in order to measure the linear position of each fingertip along the rod as well as the overall orientation of the device and hand. In some embodiments, a Time-of-Flight (ToF) sensor (STMicroelectronics VL6180X) is mounted at the tip of each rod. In some embodiments, other sensors are contemplated. In some embodiments, other sensors are contemplated. Non-limiting examples include optical encoder, magnetic encoder, linear variable differential transformer, and ultrasonic sensor. In some embodiments, the sensor measures the time that emitted IR light takes to travel to a reflective pad on the sliding mount and return to the sensor. As position between the finger and the end of the rod is measured rather than between the finger and the thumb, the sensor does not interfere when the finger and thumb are brought close to one another. In some embodiments, optical sensing generally is attractive to reducing weight and inertia of moving parts and adds no friction to the system. Within the realm of optical sensing, ToF sensing has the benefit that the signal is relatively insensitive to ambient light conditions and the quality of the reflective pad or how it varies over time (for example with smudges or dust). In some embodiments, linear variable differential transformer (LVDT) sensors, or linear capacitive sensors like those used in digital calipers would also be convenient for this form factor, but would require more systems integration work.

In some embodiments, a 9 axis inertial measurement unit (InvenSense MPU9250 with sensor fusion) is coupled to a thumb to measure orientation. In some embodiments, other sensors are contemplated. Non-limiting examples include 6 axis inertial measurement unit, hall effect sensor, optical encoder, and magnetic encoder. With a single orientation sensor, it is assumed that the thumb represents the orientation of the hand. In some embodiments, an inertial measurement unit can be added to each finger if the pose of individual fingers is important.

Control

A number of features of the design result in simple control. In some embodiments, measurement and modeling of the hand's pose is simple because the device directly measures the distances between the fingers and the thumb. This is in contrast to devices that measure joint angles. In such devices, computational effort is needed to model fingertip motion by forward kinematics, and there is a possibility of accumulating error from joint to joint.

While other haptic gloves focus on generating realistic stimuli of soft objects [21], [22], in some embodiments, the device according to the present disclosure is a position control rather than force-control device, and therefore only renders rigid bodies. In some embodiments, while limiting the system to the display of rigid bodies does reduce its capabilities, many objects in our daily lives can be approximated as rigid. However, in some embodiments, any objects may be addressed regardless of the degree of rigidity.

In some embodiments, only rigid objects are reproduced owing to the greatly simplified computation required. For example, computing rigid contact locations using a simple boundary is much less computationally expensive than soft interactions or simulated rigid contact through real-time force rendering using finite element analysis. Further, the use of friction as the force generation method results in a passively stable system without the need for active control once the brake is engaged. In some embodiments, any objects may be reproduced and grasped.

Noise Dependence on Static Displacement

Figure 8:
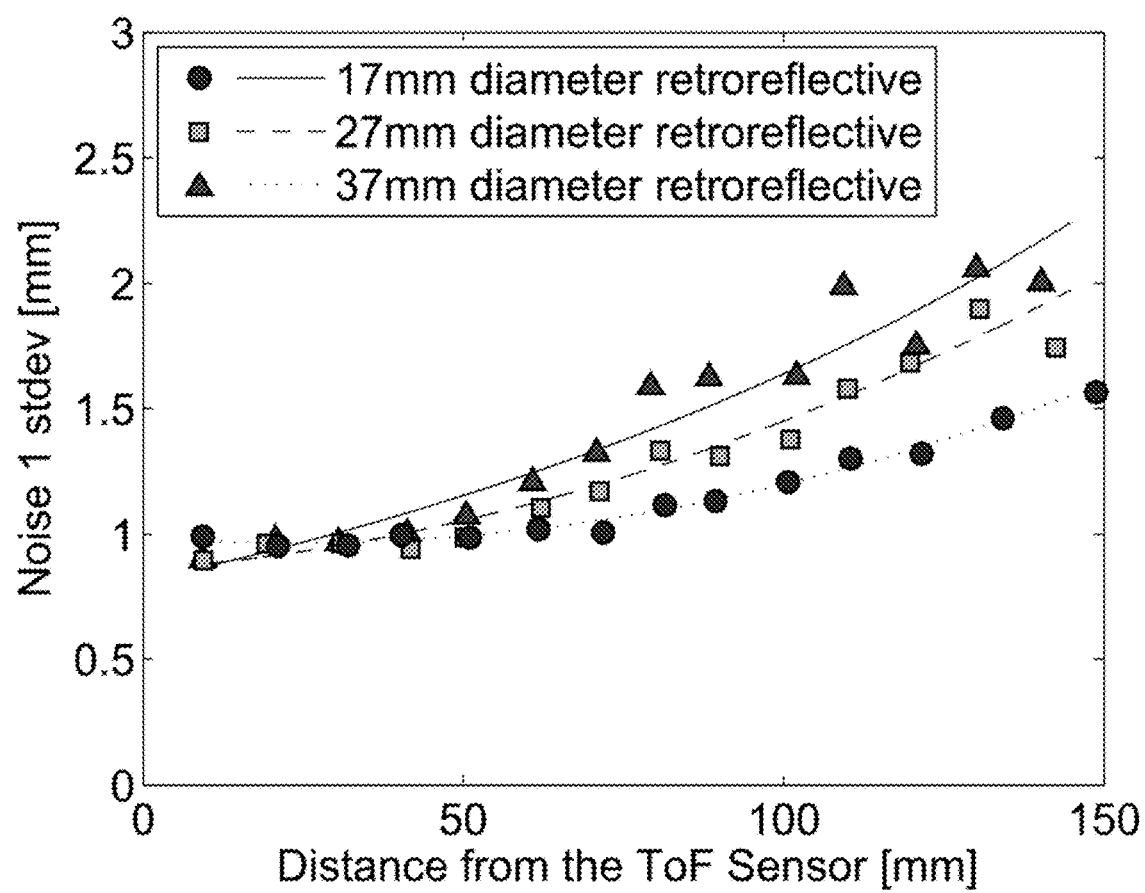
FIG. 8 shows data related to relationship between the ToF sensor noise and the distance from the sensor to the reflector, mounted on the back of a finger for an embodiment of the Wolverine. Data taken at 50 Hz sampling rate and plotted with corresponding second order fits. Circles represent 17 mm diameter retroreflective, squares represent 27 mm diameter retroreflective, and triangles represent 37 mm diameter retroreflective.

While a ToF sensor's sensitivity should be unaffected by the size of the reflecting surface (within the field of view) and its surface properties, the magnitude of the signal is affected. Therefore, the noise performance of the sensor depends on the design of the surface reflector (FIG. 8). In some embodiments, for displacement distances less than roughly 50 mm, all reflectors are fully within the field of view and so have comparable noise performance-likely determined by characteristics of the sensor and the material of the reflector. However, after a displacement of about 50 mm, the noise begins to diverge for the smaller disks. In some embodiments, the distance from ToF ranges from about 0 mm to about 200 mm. In some embodiments, the distance from ToF is about 0, 2.5, 5, 7.5, 10, 15, 20, 25, 50, 75, 100, 125, 150, 175 or 200 mm, or within a range defined by any two of the aforementioned values. In some embodiments, the disk size ranges from about 5 mm to about 50 mm. In some embodiments, the disk size is about 5, 7.5, 10, 15, 20, 25, 30, 35, 40, 45 or 50 mm, or within a range defined by any two of the aforementioned values.

Without being bound by any theory, it is not ideal that the noise increases with larger distances between the sensor and reflector, because a large distance occurs when a user grasps a small virtual object. Users are more sensitive to error grasping smaller objects. However, the magnitude of the noise (1.5 mm) is roughly the same as the just noticeable difference for humans performing small grasping tasks [26], [27], [28]. In some embodiments, the magnitude of noise ranges from about 0 mm to about 3 mm. In some embodiments, the magnitude of noise is about 0, 0.25, 0.5, 0.75, 1, 1.25, 1.5, 1.75, 2, 2.25, 2.5, 2.75 or 3 mm, or within a range defined by any two of the aforementioned values. In some embodiments, while inverting the system (i.e., sensing the distance from the fingers to the thumb directly) would decrease noise for small virtual objects, this choice would limit the reflector size due to geometric constraints and would perform much worse for all but the smallest grasps. In some embodiments, if less noise is desired, an LVDT sensor is implemented.

Resolution Versus Sampling Rate

In some embodiments, the ToF sensor measures distance continuously with the speed of light (299,792,458 m/s) and averages them down to the output frequency (100 Hz) to reduce noise. In some embodiments, the output frequency ranges from about 0.1 Hz to about 10000 Hz. In some embodiments, the output frequency is about 0.1, 0.5, 1, 5, 10, 50, 100, 500, 1000, 5000 or 10000 Hz, or within a range defined by any two of the aforementioned values. In some embodiments, for operation at slow grasping speeds, a running average can similarly be taken of the resulting data to get sub-millimeter position estimates. This utilizes a measurement rate after averaging that is lower than the 100 Hz sensor sampling rate. In some embodiments, as the system only outputs integer values corresponding to millimeter length, a slow grasp will find many repeated measurement values between whole millimeter length transitions. In some embodiments, if the distance is constant with no movement, the measurements would continue to repeat. In some embodiments, the measurement can be repeated as many times as desired. In some embodiments, the measurement can be repeated as many times as desired when a user's hand is stopped at a certain distance. By averaging these and assuming constant velocity over the course of the averaging time, one can achieve submillimeter estimations of position. In some embodiments, submillimeter estimations of position ranges from about 10 μm to about 1 mm. In some embodiments, submillimeter estimations of position is about 10, 25, 50, 75, 100, 150, 200, 250, 300, 350, 400, 450, 500, 550, 600, 650, 700, 750, 800, 850, 900, 950 μm or 1 mm, or within a range defined by any two of the aforementioned values. This, however, comes at the expense of temporal resolution. In some embodiments, temporal resolution is lowered by an amount proportional to the number of samples that are averaged. In a preferred embodiment, the system would dynamically scale the overall sensor bandwidth according to grasping speed to give increased spatial measurement accuracy for low speed grips, and increased temporal accuracy at high speeds. In some preferred embodiments, the grasping speed ranges from about 0.01 mm/s to about 5000 mm/s. In some preferred embodiments, the grasping speed is about 0.01, 0.05, 0.1, 0.5, 1, 5, 10, 50, 100, 250, 500, 750, 1000, 2000, 3000, 4000 or 5000 mm/s, or within a range defined by any two of the aforementioned values. In some preferred embodiments, the spatial measurement accuracy for low speed grips is within about 1% error to about 100% error. In some preferred embodiments, the spatial measurement accuracy for low speed grips is within about 1, 5, 10, 15, 20, 25, 30, 35, 40, 45, 50, 55, 60, 65, 70, 75, 80, 85, 90, 95 or 100% error, or within a range defined by any two of the aforementioned values. In some preferred embodiments, the increased temporal accuracy at high speeds is within about 1% error to about 100% error. In some preferred embodiments, the increased temporal accuracy at high speeds is within about 1, 5, 10, 15, 20, 25, 30, 35, 40, 45, 50, 55, 60, 65, 70, 75, 80, 85, 90, 95 or 100% error, or within a range defined by any two of the aforementioned values.

Figure 9:
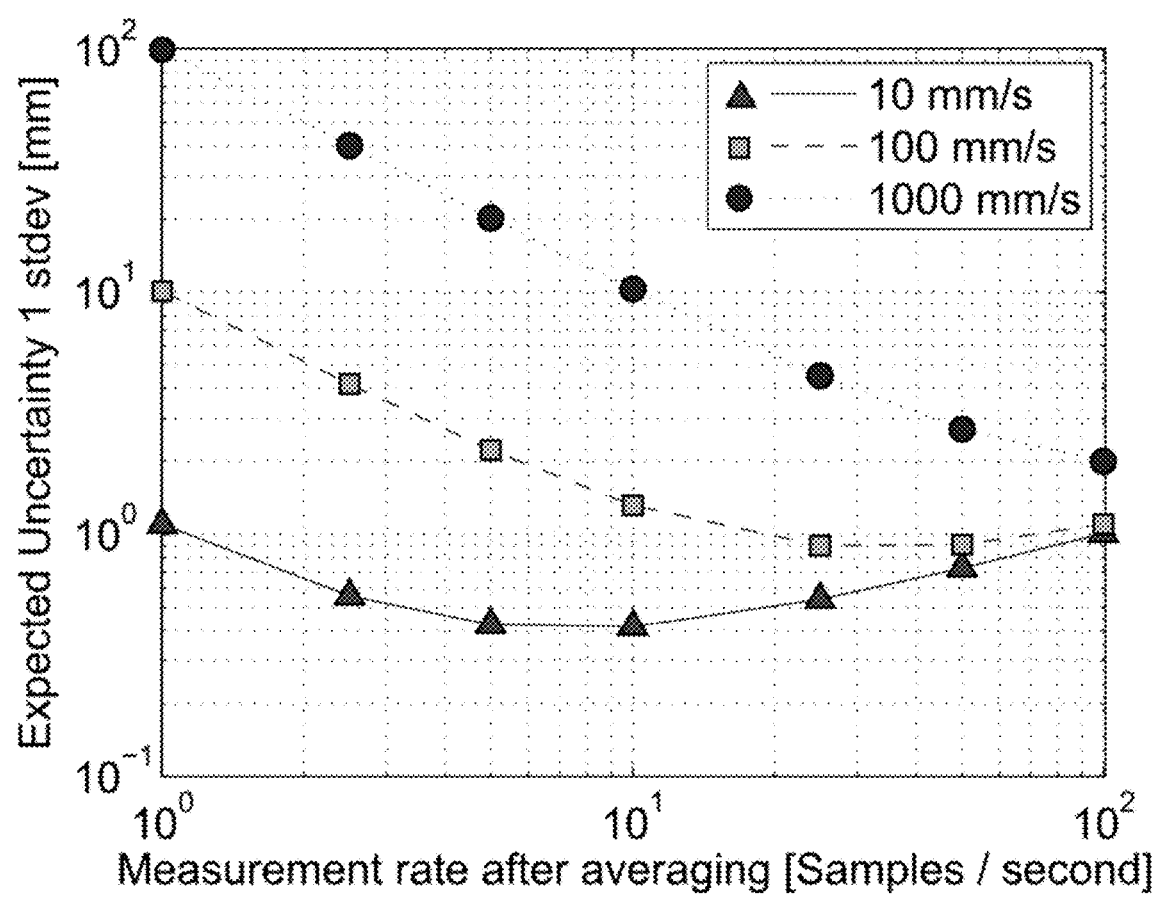
FIG. 9 shows data related to simulation of expected position uncertainty versus measurement rate after averaging for a variety of grasp speeds (10 mm/s to 1000 mm/s) for an embodiment of the Wolverine. This assumes a temporal uncertainty is of 10% of the effective measurement period. Circles represent 1000 mm/s, squares represent 100 mm/s, and triangles represent 10 mm/s.

In practice, a constant velocity of movement cannot be assumed by the user. This means that continually decreasing the measurement rate after averaging does not necessarily result in decreased uncertainty. Simulated results of a relationship between measurement rate after averaging and position uncertainty with non-constant velocity, assuming that the non-constant velocity results in a temporal uncertainty of roughly 10% of the total time period (the actual uncertainty will be investigated in future human studies), are plotted in FIG. 9. In some embodiments, the non-constant velocity results in a temporal uncertainty of roughly about 1% to about 100% of the total time period. In some embodiments, the non-constant velocity results in a temporal uncertainty of about 1, 5, 10, 20, 30, 40, 50, 60, 70, 80, 90 or 100% of the total time period, or a temporal uncertainty within a range defined by any two of the aforementioned values. In some embodiments, at low grasp speeds, a low measurement rate after averaging can result in lower uncertainty than a higher measurement rate after averaging. In some embodiments, a position uncertainty at a low measurement rate after averaging is very large because the measurement is not keeping up with the real motion. In some embodiments, at a high measurement rate after averaging, an increase in noise in the measurement is observed due to the increased sensor bandwidth. In some embodiments, for slow grasps a minimum in uncertainty where these competing effects balance is observed. In some embodiments, given the slopes on both sides of this minimum it is safer to favor the side of high measurement rate after averaging. In some embodiments, for quick grasps in this range, a higher measurement rate after averaging results in lower uncertainty, monotonically.

Spatial Uncertainty

Figure 6:
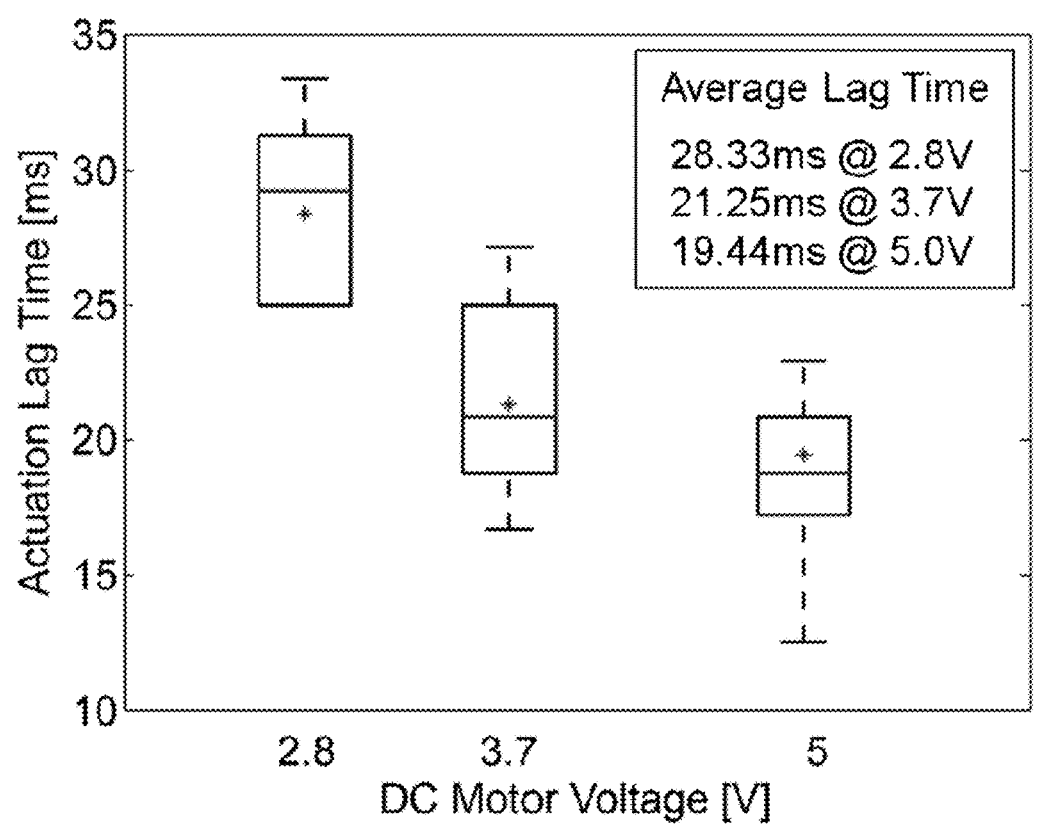
FIG. 6 shows data related to the time for the dc motor to tilt and engage the locking levers at various voltages for an embodiment of the Wolverine.
Figure 11:
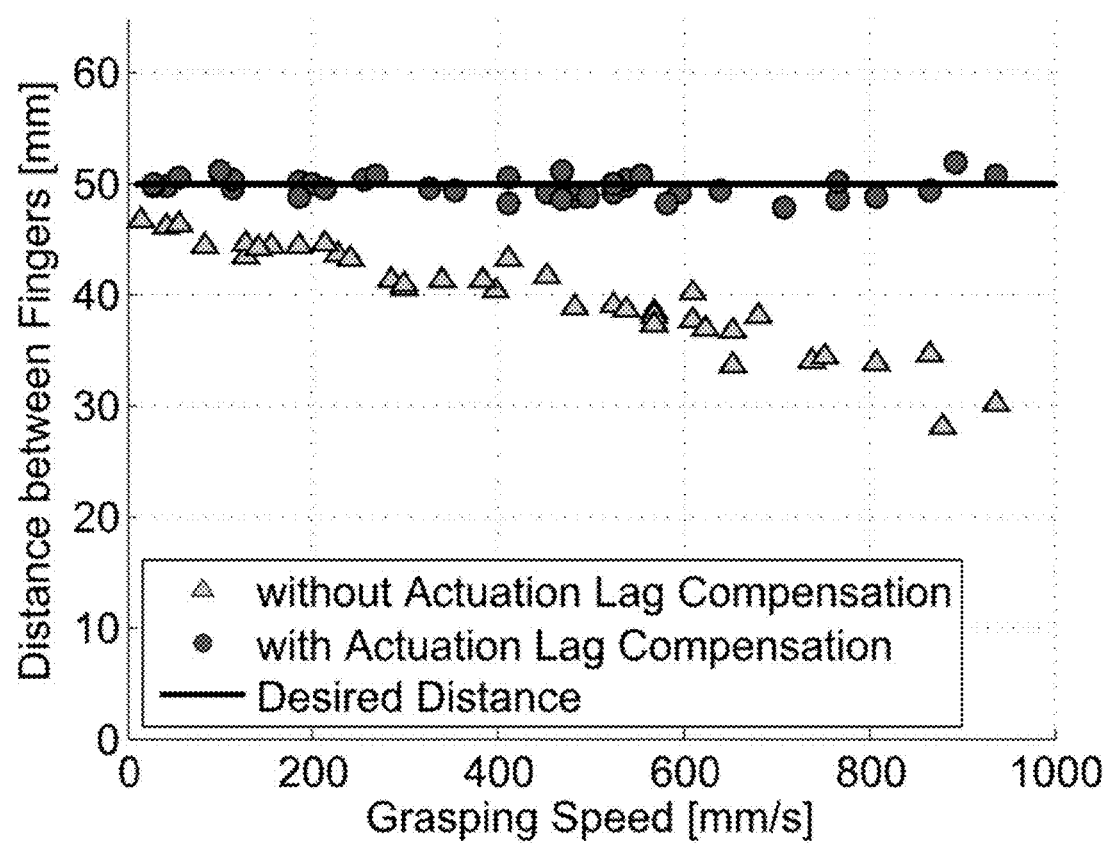
FIG. 11 shows data related to test results of the distance between fingers at various grasping speeds, using an encoder to measure distance for an embodiment of the Wolverine. Triangles represent data without actuation lag compensation. Circles represent data with actuation lag compensation.

In some embodiments, there are at least 4 main sources of spatial uncertainty for the device attempting to grip at a known distance:

a) In some embodiments, Sensor Noise is shown to vary inversely with grip size (See, Noise dependence on static displacement) and can be made through further averaging (See, Resolution versus Sampling Rate) to decrease with slower grip speeds. In some embodiments, grip size ranges from about 2 mm to about 200 mm. In some embodiments, grip size is about 2, 5, 10, 20, 25, 50, 75, 100, 125, 150, 175 or 200 mm, or within a range defined by any two of the aforementioned values b) In some embodiments, Sensor Lag is important during fast grasping motions. In some embodiments, with the current sampling rate of 100 Hz sampling rate the system only gets an updated position every 10 ms, meaning the data is, on average, 5 ms old. In some embodiments, the uncertainty due to this lag will increase linearly with grasping speed, and can be removed with a forward model (FIG. 11) assuming constant velocity. In some embodiments, the uncertainty due to this lag increases linearly with grasping speed by about 1 ms to about 100 ms. In some embodiments, the uncertainty due to this lag increases linearly with grasping speed by about 1, 2, 5, 10, 15, 20, 25, 30, 35, 40, 45, 50, 55, 60, 65, 70, 75, 80, 85, 90, 95 or 100 ms, or within a range defined by any two of the aforementioned values.

c) In some embodiments, Actuator Lag has been found to be about 20 ms on average (See, FIG. 6) Like sensor lag, the resulting error will be linear with grasping speed, and can be removed with a forward model as well (FIG. 11). In some embodiments, Actuator Lag ranges from about 4 ms to about 40 ms. In some embodiments, Actuator Lag is about 4, 8, 12, 16, 20, 24, 28, 32, 36 or 40 ms, or within a range defined by any two of the aforementioned values d) In some embodiments, Actuator Lag Variance, like actuator lag, will result in an error that is linear with grip velocity. However, like sensor noise, this uncertainty is not predictable because is represents variability in the actuation time itself. As can be seen in FIG. 6, the faster average actuation times result in smaller variances reducing the impact of this term. In some embodiments, variability in the actuation time ranges from about 5 ms to about 100 ms. In some embodiments, variability in the actuation time is about 5, 10, 15, 20, 25, 30, 35, 40, 45, 50, 55, 60, 65, 70, 75, 80, 85, 90, 95 or 100 ms, or within a range defined by any two of the aforementioned values.

In some embodiments, Sensor noise and sensor lag errors are considered to be independent, as are actuator lag and actuator lag variance errors. In some embodiments, this means that at least to the first order these can be all treated as independent uncertainties and so should add according to:

$$\sigma_{total} = \sqrt{\sigma_a^2 + \sigma_b^2 + \sigma_c^2 + \sigma_d^2} \quad (5)$$

In some embodiments, the specific details of error and whether it occurs before or after forward modeling could cause coupling between the uncertainty terms in application due to a possible shared dependency on velocity.

In some embodiments, when properly filtered, sensor noise should be proportional to velocity. The remaining error in sensor lag and actuator lag after feed forward canceling (e.g., due to the imperfect constant velocity approximation) should also be proportional to velocity (but is likely small), as should actuator lag variance. This results in the total uncertainty being proportional to grip velocity, and having a magnitude of roughly 10 mm for the fastest grip rates. In some embodiments, the total uncertainty ranges from about 0.5 mm to about 50 mm. In some embodiments, the total uncertainty is about 0.5, 1, 5, 10, 15, 20, 25, 30, 35, 40, 45 or 50 mm, or within a range defined by any two of the aforementioned values. In some embodiments, the velocity ranges from about 0.01 mm/s to about 5000 mm/s. In some embodiments, the velocity is about 0.01, 0.05, 0.1, 1, 5, 10, 50, 100, 500, 1000, 1500, 2000, 2500, 3000, 3500, 4000, 4500 or 5000 mm/s, or within a range defined by any two of the aforementioned values. In some embodiments, a small constant distance offset of 2.9 mm is noted, regardless of grasping speed, due to a small amount of backlash in the system. In some embodiments, a small constant distance offset ranges from about 0.1 mm to about 10 mm. In some embodiments, a small constant distance offset is about 0.1, 0.25, 0.5, 0.75, 1, 2, 3, 4, 5, 6, 7, 8, 9 or 10 mm, or within a range defined by any two of the aforementioned values.

Figure 12:
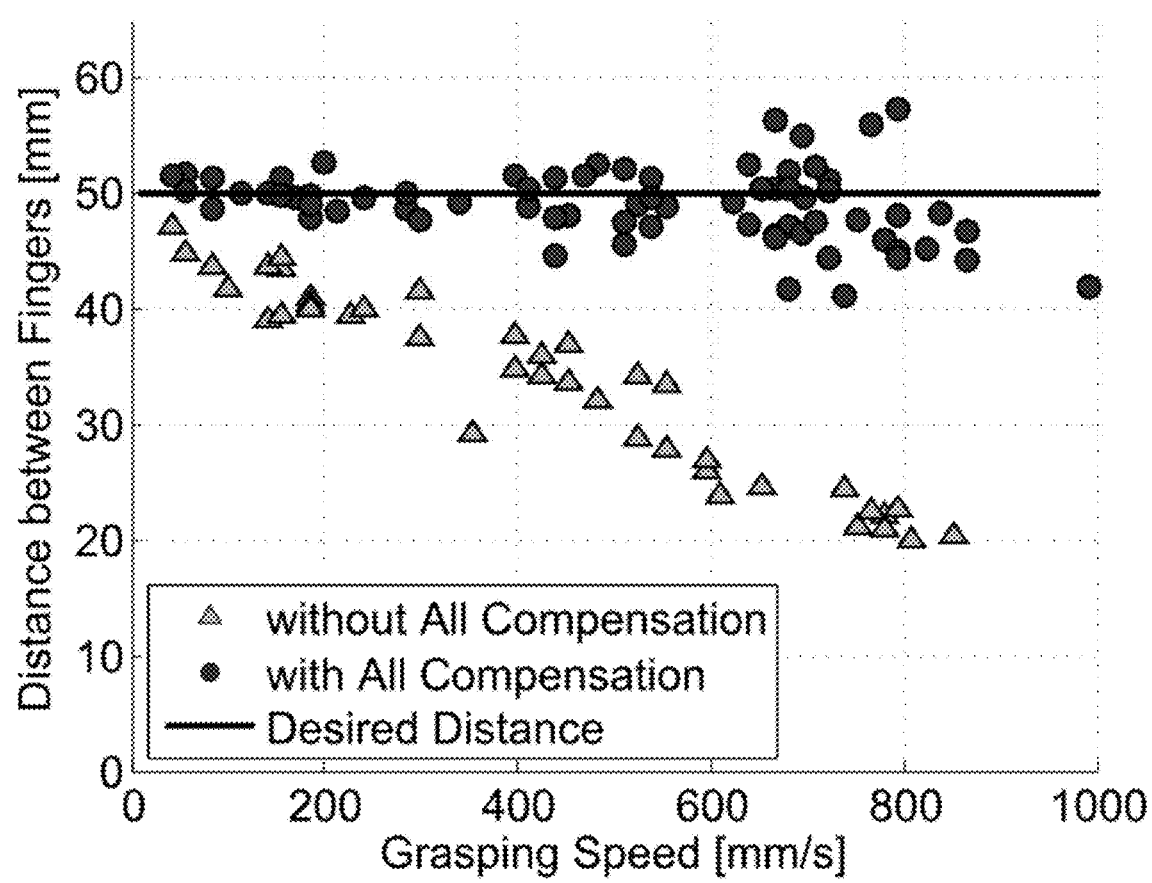
FIG. 12 shows data related to test results of the distance between fingers at various grasping speeds, using the onboard ToF sensor for an embodiment of the Wolverine. Uncertainty due to actuator and sensing/communication lag is present. Triangles represent data without all compensation. Circles represent data with all compensation.

In some embodiments, the device has reliable performance over a wide range of grasping speeds by adapting a forward model to compensate actuation, sensing and communication lags (FIG. 12). In some embodiments, a forward model is built to compensate both the distance offset due to actuation lag and the constant offset which is governed by Equation 6 shown in Example 7. In some embodiments, $d_{des}$ ranges from about 0 mm to about 200 mm. In some embodiments, $d_{des}$ is about 0, 1, 5, 10, 15, 20, 25, 35, 45, 50, 75, 100, 125, 150, 175 or 200 mm, or within a range defined by any two of the aforementioned values. In some embodiments, $t_{act\_lag}$ ranges from about 4 ms to about 40 ms. In some embodiments, $t_{act\_lag}$ is about 4, 8, 12, 16, 20, 24, 28, 32, 36 or 40 ms, or within a range defined by any two of the aforementioned values. In some embodiments, $d_{const}$ ranges from about 0.1 mm to about 10 mm. In some embodiments, $d_{const}$ ranges from about 0.1, 0.25, 0.5, 0.75, 1, 2, 3, 4, 5, 6, 7, 8, 9 or 10 mm, or within a range defined by any two of the aforementioned values.

In some embodiments, lag due to sensing and communication can be added to the forward model to help mitigate the uncertainty due to both the actuation lag and the sensing/communication lag, which can be represented by Equation 7 in Example 8. In some embodiments, $d_{model}$ ranges from about 0 mm to about 2000 mm. In some embodiments, $d_{model}$ is about 0, 1, 5, 10, 25, 50, 75, 100, 200, 300, 400, 500, 600, 700, 800, 900, 1000, 1250, 1500, 1750 or 2000 mm, or within a range defined by any two of the aforementioned values. In some embodiments, $d_{des}$ ranges from about 0 mm to about 200 mm. In some embodiments, $d_{des}$ is about 0, 1, 5, 10, 25, 50, 75, 100, 125, 150, 175 or 200 mm, or within a range defined by any two of the aforementioned values. In some embodiments, $t_{act\_lag}$ ranges from about 4 ms to about 40 ms. In some embodiments, $t_{act\_lag}$ is about 4, 8, 12, 16, 20, 24, 28, 32, 36 or 40 ms, or within a range defined by any two of the aforementioned values. In some embodiments, $t_{sam\_lag}$ ranges from about 0.1 ms to about 10000 ms. In some embodiments, $t_{sam\_lag}$ is about 0.1, 0.5, 1, 5, 10, 50, 100, 250, 500, 750, 1000, 2500, 5000, 7500 or 10000 ms, or within a range defined by any two of the aforementioned values. In some embodiments, $t_{com\_lag}$ ranges from about 0.001 ms to about 1 ms. In some embodiments, $t_{com\_lag}$ is about 0.001, 0.0025, 0.005, 0.0075, 0.01, 0.025, 0.05, 0.075, 0.1, 0.25, 0.5, 0.75 or 1 ms, or within a range defined by any two of the aforementioned values. In some embodiments, $d_{const}$ ranges from about 0.1 mm to about 10 mm. In some embodiments, $d_{const}$ is about 0.1, 0.25, 0.5, 0.75, 1, 2, 3, 4, 5, 6, 7, 8, 9 or 10 mm, or within a range defined by any two of the aforementioned values.

Device Performance

In some embodiments, the Wolverine is a mobile, wearable haptic interface designed for simulating the grasping of rigid objects in virtual environment. In some embodiments, leveraging low-power brake-based locking sliders, the system can withstand over 100 N of force between each finger and the thumb, and only consumes 2.78 Wh (10 mJ) for each braking interaction. In some embodiments, leveraging low-power brake-based locking sliders, the system can withstand over 100N of force between each finger and the thumb, and only consumes 0.24 mWh (0.87 joules) for each braking interaction. Integrated sensors are used both for feedback control and user input: time-of-flight sensors provide the position of each finger and an inertial measurement unit provides overall orientation tracking. In some embodiments, the system can withstand a force between each finger and the thumb of about 0.05 N to about 500 N. In some embodiments, the system can withstand a force between each finger and the thumb of about 0.05, 0.1, 0.25, 0.5, 0.75, 1, 2.5, 5, 7.5, 10, 25, 50, 75, 100, 125, 250, 375 or 500 N, or within a range defined by any two of the aforementioned values. In some embodiments, the device consumes about 0.01 mWh to about 1 mWh of energy for each braking interaction. In some embodiments, the energy consumed by the device for each braking interaction is about 0.01, 0.02, 0.03, 0.04, 0.05, 0.075, 0.1, 0.25, 0.5, 0.75 or 1 mWh, or within a range defined by any two of the aforementioned values.

In some embodiments, a 3.7 V 350 mAh battery is used to run the device. In some embodiments, other similar batteries are contemplated. In some embodiments, a baseline current is about 50 mA for the microprocessor, finger sensors, and thumb orientation sensor. In some embodiments, when the finger brake motors are actuated, the total current increases to 780 mA for a 320 ms actuation cycle. This design enables us to use the device for roughly 5 hours with 1500 full fingered grasping events. In some embodiments, the design enables use of the device for roughly 6 hours with 5500 full fingered grasping events. In some embodiments, the duration of the actuation cycle ranges from about 10 ms to about 1000 ms. In some embodiments, the duration of the actuation cycle is about 10, 25, 50, 75, 100, 200, 300, 400, 500, 600, 700, 800, 900 or 1000 ms, or within a range defined by any two of the aforementioned values. In some embodiments, the device can be run for about 0 min to about 600 min. In some embodiments, the device can be run for about 0, 10, 20, 30, 40, 50, 60, 120, 180, 240, 300, 360, 420, 480, 540 or 600 min, or within a range defined by any two of the aforementioned values. In some embodiments, the number of full fingered grasping events ranges from about 0 to about 10000. In some embodiments, the number of full fingered grasping events is about 0, 5, 10, 25, 50, 75, 100, 250, 500, 750, 1000, 2500, 5000, 7500 or 10000, or within a range defined by any two of the aforementioned values.

Figure 10:
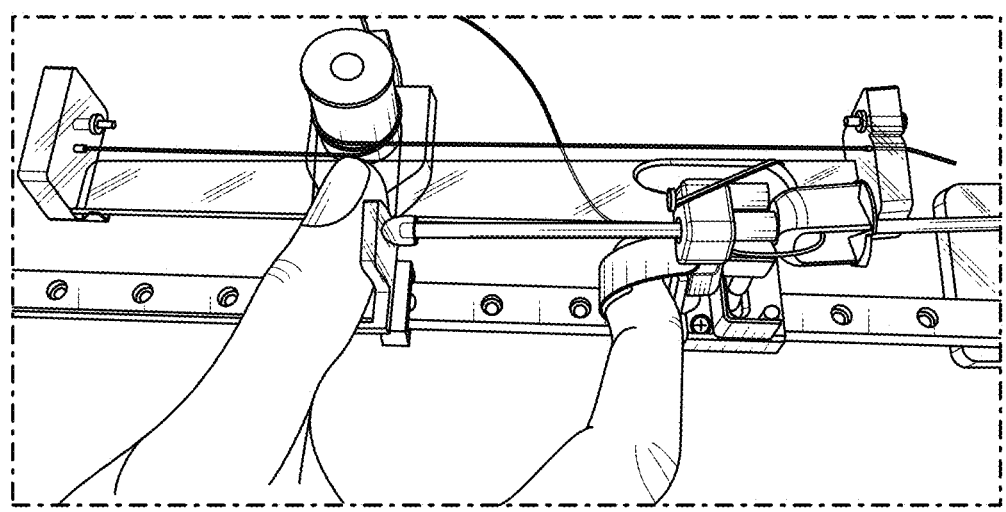
FIG. 10 shows a test rig for measuring absolute distance and velocity of the device using an encoder in addition to the onboard ToF sensor for an embodiment of the Wolverine.

In some embodiments, errors in actual locking positions are analyzed by mounting the device to a linear guide with an incremental rotary encoder as shown in FIG. 10. In some embodiments other encoders are contemplated. In some embodiments, the encoder yields a linear resolution of about 14.2 µm. In some embodiments, the encoder yields a linear resolution of about 1 µm to about 5000 µm. In some embodiments, the encoder yields a linear resolution of about 1, 5, 10, 25, 50, 75, 100, 250, 500, 750, 1000, 1250, 2500, 3750 or 5000 µm, or within a range defined by any two of the aforementioned values.

Possible Virtual Objects

Table 1 shows that the Wolverine can provide a large range of motion and high resistance forces, but all other systems provide variable stiffness. The trend toward mobile VR applications like the Samsung Galaxy VR makes the Wolverine device particularly interesting. In some embodiments, the lightweight, battery-powered design could be consumer friendly, and the processing of binary output signals is computationally simple, making it feasible even on mobile processors.

In some embodiments, give the wide range of motion possible with the Wolverine and high stiffness of many objects in our daily lives, many objects in our daily lives can be simulated by the Wolverine. In some embodiments, the range of motion possible with the Wolverine ranges from about 20 mm to about 160 mm. In some embodiments, the range of motion possible with the Wolverine ranges from about 2 mm to about 200 mm. In some embodiments, the range of motion possible with the Wolverine is about 2, 5, 10, 20, 40, 60, 80, 100, 120, 140, 160, 180 or 200 mm, or within a range defined by any two of the aforementioned values. In some embodiments, the stiffness of objects in our daily lives is about 162 N/mm. In some embodiments, the stiffness of objects in our daily lives ranges from about 0.1 N/mm to about 1000 N/mm. In some embodiments, the stiffness of objects in our daily lives is about 0.1, 0.5, 1, 5, 10, 25, 50, 75, 100, 125, 250, 375, 500, 750 or 1000 N/mm, or within a range defined by any two of the aforementioned values. Based on the YCB Object and Model Set [29], a reference of objects of daily life, about 75% items in the set could be rendered by the Wolverine. In some embodiments, about 50% to about 99.9% objects of daily life are rendered by the Wolverine. In some embodiments, about 50, 55, 60, 65, 70, 75, 80, 85, 90, 95 or 99% objects of daily life are rendered by the Wolverine, or a value within a range defined by any two of the aforementioned values.

EXAMPLES

The following Examples are non-limiting and other variants contemplated by one of ordinary skill in the art are included within the scope of this disclosure.

Example 1

Performance Analysis Based on Actuation Speed

To decide the voltage for actuation, the dc motor was powered with different voltages. As shown in FIG. 6, higher voltages made faster responses. Also, the variance of the actuation lag was reduced in higher voltages. This means a higher voltage can generate faster and more reliable motions for this system. However, repeated operation at 5 V resulted in damage to the gearbox. Therefore, for this system 3.7 V was chosen.

With 3.7 V, the average time to rotate the lever into the locked, or "in," position was 21 ms. This actuation speed is less than the delay a human notices between visual and haptic stimuli (45 ms) [23], [24]. The actuation time could be further reduced by decreasing the angle through which the lever must rotate. However, this could decrease robustness, because the system is closer to jamming in the unlocked position; a small perturbation could result in undesired locking.

Example 2

Performance Analysis Based on Force Analysis

To characterize its stiffness and maximum force, a set of actuation parts was mounted to Instron MicroTester 5848 and measured the compression force with the brake engaged. The force-displacement curve in FIG. 7 shows the stiffness during braking is 162 N/mm. The maximum force before slipping is 106 N. The brake force is a frictional force between the carbon fiber rod and an aluminum flat washer affixed to the lever.

Example 3

Performance Analysis Based on Sensor Noise Analysis

FIG. 8 shows the one standard deviation noise magnitude as a function of displacement from the sensor to the back of the finger for 3 different reflector designs. It is noted that for small distances, less than roughly 50 mm, all reflectors are fully within the field of view and so have comparable noise performance—likely determined by characteristics of the sensor and the material of the reflector. However, after a displacement of about 50 mm, the noise begins to diverge for the smaller disks. The 37 mm disk size was found to be the largest size possible that did not interfere with the grasp mechanics.

Example 4

Measurement Rate Versus Position Uncertainty

To illustrate the relationship between measurement rate after averaging and position uncertainty with non-constant velocity, it was assumed that the non-constant velocity results in a temporal uncertainty of roughly 10% of the total time period (the actual uncertainty will be investigated in future human studies). The simulated results are plotted in FIG. 9. The position uncertainty at a low measurement rate after averaging is very large because the measurement is not keeping up with the real motion. At a high measurement rate after averaging, an increase in noise in the measurement is observed due to the increased sensor bandwidth. For slow grasps a minimum in uncertainty where these competing effects balance is observed. Given the slopes on both sides of this minimum it is safer to favor the side of high measurement rate after averaging. Further, for quick grasps in this range, a higher measurement rate after averaging results in lower uncertainty, monotonically.

Example 5

Power Consumption

A 3.7 V 350 mAh battery was used to run the device. The electrical current consumption was measured using a power supply to simulate the battery at 3.7 V. The baseline current was found to be about 50 mA for the microprocessor, finger sensors, and thumb orientation sensor. When the finger brake motors are actuated, the total current increases to 780 mA for the 320 ms actuation cycle. This design enables us to use the device for roughly five hours with 1500 full fingered grasping events.

Example 6

Uncertainty Verification

To analyze errors in actual locking positions, the device was mounted to a linear guide with an incremental rotary encoder as shown in FIG. 10. A capstan drive was used to connect the encoder shaft and device with minimal friction. The encoder's 1024 cycles per revolution in quadrature result in a linear resolution of 14.2 μm. Velocity is calculated at 1000 Hz.

Two tests were ran, first analyzing the uncertainty due only to actuation lag and how well the implemented actuation lag compensation works (Example 7), and second analyzing the uncertainty due to both the actuation and sensing/communication lag and how well the full (actuation plus sensing/communication) compensation works (Example 8). Such compensation helps improve performance, especially at high grasping speeds, where expected error is over 20 mm.

Example 7

Actuation Lag Compensation

To analyze the actuation lag error alone, the desired position was set to 50 mm while sensing with the encoder for control, not with the on-board ToF sensor. This allowed us to temporarily remove errors from the on-board position sensor to accurately characterize errors due to actuator lag alone. The results are shown in FIG. 11 as triangles, and together represent an actuator lag of 23.4 ms which is similar to the values shown in FIG. 6. This average lag time generates a distance offset that increases linearly with grasping speed. A small constant distance offset of 2.9 mm is noted, regardless of grasping speed, due to a small amount of backlash in the system. These experimental values allow a forward model to be built to compensate both the distance offset due to actuation lag and the constant offset. The equation governing this is given by:

$$d_{act\_model} = d_{des} + v \ast t_{act\_lag} + d_{const} \quad (6)$$

where $d_{act\_model}$ is the modified distance without the ToF sensor to activate the brake compensating distance errors from lags, $d_{des}$ is the actual distance we want to stop, $t_{act\_lag}$ is the time delay due to the brake activation, and $d_{const}$ is distance offset due to the backlash during the brake activation, and where $d_{des}=50$ mm, $t_{act\_lag}=23.4$ ms, $d_{const}=2.9$ mm.

The circles in FIG. 11 are the experimental data with this compensation. The system shows uncertainty that is independent of grasping speed. Therefore the only uncertainty is due to actuator lag. No uncertainty due to sensing/communication lag is present (See, Example 8). There are still, however, small errors from the desired distance due to imperfect actuation repeatability. This can potentially be improved by adopting a faster or more consistent actuator.

Example 8

Sensing and Communication Lag

To test the uncertainty due to both the actuation lag and the sensing/communication lag, the device was tested using the onboard ToF sensor while measuring the actual distance with the encoder. As shown in FIG. 12, the error is substantial, especially for high grasping speeds. Lag was added due to sensing and communication to the forward model to help mitigate this error. The dominant lag comes from the sampling rate itself; the sampling period is 10 ms, resulting in an effective sample lag of 5 ms. Further, the I²C communication takes an additional 0.2 ms. These lags can be added to the model:

$$d_{model} = d_{des} + v \ast (t_{act\_lag} + t_{sam\_lag} + t_{com\_lag}) + d_{const} \quad (7)$$

where $d_{model}$ is the modified distance to activate the brake compensating distance errors from lags, $d_{des}$ is the actual distance we want to stop, $t_{act\_lag}$ is the time delay due to the brake activation, $t_{act\_lag}$ is the time delay due to the brake activation, $t_{sam\_lag}$ is the time delay due to the sampling rate, $t_{com\_lag}$ is the time delay due to the communication lag, and $d_{const}$ is distance offset due to the backlash during the brake activation.

Both these forward models rely on the assumption that human fingers only move in one direction during grasping motions.

Implementing the full forward model for actuation plus sensing/communication lag, improved results were observed as shown in FIG. 12. It was observed that both the bias and the systematic error with increasing velocity were almost entirely removed. All that remains is the uncertainty that increases with velocity as previously predicted and described. This error is likely due to sensor noise and errors in the assumption of constant velocity because of the difference in errors seen in FIG. 11 (circles) and FIG. 12 (circles). Actuator lag uncertainty is also present but appears to be less important, especially at higher speeds.

Comparison of the Wolverine with Other Devices

TABLE 1 provides details for comparison with Cyber-Grasp [3] and other devices. As shown in the table, the Wolverine system can provide a large range of motion and high resistance forces, but all other systems provide variable stiffness.

TABLE 1

COMPARISONS WITH OTHER DEVICES.

| | Wolverine | CyberGrasp [3] | Rutgers Master II [4] | DESR [5] |
|---|---|---|---|---|
| Grasp Type | pad opposition only | pad, palm, side opposition | palm opposition only | pad opposition only |
| Actuator Type | one-way brake | dc motor with wire driven | pneumatic cylinder | electroactive polymer |
| Force Feedback | constant stiffness | variable stiffness | variable stiffness | variable stiffness |
| Maximum Force | 106 N | 12 N | 16 N | 7.2 N |
| Motion Range | 20-160 mm | full hand closing | 27 mm stroke | 5 mm stroke |
| Power Source | built-in battery | external cables | external tubes | external cables |
| Weight | 55 g | 450 g | 185 g | 38 g |

The trend toward mobile VR applications like the Samsung Galaxy VR makes the Wolverine device particularly interesting. The lightweight, battery-powered design could be consumer friendly, and the processing of binary output signals is computationally simple, making it feasible even on mobile processors.

Conclusion and Perspectives

The present disclosure provides the Wolverine haptic feedback device for virtual grasping of rigid objects. The brake mechanism can provide over 100 N of force between each finger and the thumb. With the forward model of the present disclosure and integrated time of flight sensors, distances between the thumb and finger ca be rendered with a resolution close to that of human perception. The Wolverine system is lightweight (under 55 gm including all sensors and battery), low power (can run on a 350 mAh battery for 5 hrs), low cost (under $40 in parts for mass production), and has a large motion range, making it ideal for mobile consumer use. Its major limitation is that it does not render variable stiffness and is therefore suited for only certain applications.

Future work will focus on building up the rest of the infrastructure for performing user studies to validate its use. For such studies, it is contemplated to integrate the device with a consumer VR display. In order to do so, a knowledge of the position of all fingers and the thumb is required. Since finger position is measured locally with respect to the thumb, and the inertial measurement unit provides the orientation of the thumb, all that is required is the 3-axis global coordinates of the thumb. For this a simple motion tracking sensor would be adequate. In addition, characterizing the effect of dynamic filtering based on the current grasp speed (to reduce noise) is contemplated, as well as explore faster actuation of the Wolverine's brake mechanism and more accurate and high speed position sensing. All of these changes could potentially improve the accuracy of the haptic rendering.

As used herein, the section headings are for organizational purposes only and are not to be construed as limiting the described subject matter in any way. All literature and similar materials cited in this application, including but not limited to, patents, patent applications, articles, books, treatises, and internet web pages are expressly incorporated by reference in their entireties. When definitions of terms in incorporated references appear to differ from the definitions provided in the present teachings, the definition provided in the present teachings shall control. It will be appreciated that there is an implied "about" prior to the temperatures, concentrations, times, etc. discussed in the present teachings, such that slight and insubstantial deviations are within the scope of the present teachings herein.

In this application, the use of the singular includes the plural unless specifically stated otherwise. Also, the use of "comprise", "comprises", "comprising", "contain", "contains", "containing", "include", "includes", and "including" are not intended to be limiting.

As used in this specification and claims, the singular forms "a," "an" and "the" include plural references unless the content clearly dictates otherwise.

Although this disclosure is in the context of certain embodiments and examples, those of ordinary skill in the art will understand that the present disclosure extends beyond the specifically disclosed embodiments to other alternative embodiments and/or uses of the embodiments and obvious modifications and equivalents thereof. In addition, while several variations of the embodiments have been shown and described in detail, other modifications, which are within the scope of this disclosure, will be readily apparent to those of ordinary skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes or embodiments of the disclosure. Thus, it is intended that the scope of the present disclosure herein disclosed should not be limited by the particular disclosed embodiments described above.

REFERENCES

All references cited in this disclosure are incorporated herein by reference in their entireties.

[1] T. H. Massie and J. K. Salisbury, "The phantom haptic interface: A device for probing virtual objects," in Proceedings of the ASME winter annual meeting, symposium on haptic interfaces for virtual environment and teleoperator systems, vol. 55, no. 1. Chicago, Ill., 1994, pp. 295-300.

[2] M. Sato, "Development of string-based force display: Spidar," in 8th International Conference on Virtual Systems and Multimedia. Citeseer, 2002.

[3] "Cybergrasp, cyberglove systems inc." http://www.cyberglovesystems. com/cybergrasp/, accessed: 2016-02-28.

[4] M. Bouzit, G. Burdea, G. Popescu, and R. Boian, "The rutgers master ii-new design force-feedback glove," Mechatronics, IEEE/ASME Transactions on, vol. 7, no. 2, pp. 256-263, 2002.

[5] R. Zhang, A. Kunz, P. Lochmatter, and G. Kovacs, "Dielectric elastomer spring roll actuators for a portable force feedback device," in Haptic Interfaces for Virtual Environment and Teleoperator Systems, 2006 14th Symposium on. IEEE, 2006, pp. 347-353.

[6] T. Endo, H. Kawasaki, T. Mouri, Y. Ishigure, H. Shimomura, M. Matsumura, and K. Koketsu, "Five-fingered haptic interface robot: Hiro iii," Haptics, IEEE Transactions on, vol. 4, no. 1, pp. 14-27, 2011.

[7] D. Gao and W. J. Book, "Steerability in planar dissipative passive robots," The International Journal of Robotics Research, 2009.

[8] Y. Matsuoka and B. Townsend, "Design of life-size haptic environments," in Experimental Robotics VII. Springer, 2001, pp. 461-470.

[9] Y. Hirata, Y. Tozaki, and K. Kosuge, "Wire-type human support system controlled by servo brakes," in 2012 IEEE/RSJ International Conference on Intelligent Robots and Systems. IEEE, 2012, pp. 3356-3361.

[10] T. Koyama, I. Yamano, K. Takemura, and T. Maeno, "Multi-fingered exoskeleton haptic device using passive force feedback for dexterous teleoperation," in Intelligent Robots and Systems, 2002. IEEE/RSJ International Conference on, vol. 3. IEEE, 2002, pp. 2905-2910.

[11] K. Koyanagi, Y. Fujii, and J. Furusho, "Development of vr-stef system with force display glove system," in Proceedings of the 2005 international conference on Augmented tele-existence. ACM, 2005, pp. 91-97.

[12] L. Jiang, "Portable haptic feedback for training and rehabilitation," p. 114, 2009, copyright—Database copyright ProQuest LLC; ProQuest does not claim copyright in the individual underlying works; Last updated—2016-05-28. [Online]. Available: http://search.proquest.com/docview/305009113?accountid=14026.

[13] S. H. Winter and M. Bouzit, "Use of magnetorheological fluid in a force feedback glove," Neural Systems and Rehabilitation Engineering, IEEE Transactions on, vol. 15, no. 1, pp. 2-8, 2007.

[14] J. Blake and H. B. Gurocak, "Haptic glove with mr brakes for virtual reality," Mechatronics, IEEE/ASME Transactions on, vol. 14, no. 5, pp. 606-615, 2009.

[15] Y. Nam, M. Park, and R. Yamane, "Smart glove: hand master using magnetorheological fluid actuators," in International Workshop and Conference on Photonics and Nanotechnology 2007. International Society for Optics and Photonics, 2007, pp. 679 434-679 434.

[16] Y. Lee and D. Ryu, "Wearable haptic glove using micro hydraulic system for control of construction robot system with yr environment," in Multisensor Fusion and Integration for Intelligent Systems, 2008. MFI 2008. IEEE International Conference on. IEEE, 2008, pp. 638-643.

[17] I. Zubrycki and G. Granosik, "Novel haptic glove-based interface using jamming principle," in Robot Motion and Control (RoMoCo), 2015 10th International Workshop on. IEEE, 2015, pp. 46-51.

[18] T. M. Simon, R. T. Smith, and B. H. Thomas, "Wearable jamming mitten for virtual environment haptics," in Proceedings of the 2014 ACM International Symposium on Wearable Computers. ACM, 2014, pp. 67-70.

[19] M. R. Cutkosky, "On grasp choice, grasp models, and the design of hands for manufacturing tasks," Robotics and Automation, IEEE Transactions on, vol. 5, no. 3, pp. 269-279,1989.

[20] T. Feix, J. Romero, H. -B. Schmiedmayer, A. M. Dollar, and D. Kragic, "The grasp taxonomy of human grasp types."

[21] K. Salisbury, D. Brock, T. Massie, N. Swarup, and C Zilles, "Haptic rendering: Programming touch interaction with virtual objects," in Proceedings of the 1995 symposium on Interactive 3D graphics. ACM, 1995, pp. 123-130.

[22] D. C. Ruspini, K. Kolarov, and 0. Khatib, "The haptic display of complex graphical environments," in Proceedings of the 24th annual conference on Computer graphics and interactive techniques. ACM Press/Addison-Wesley Publishing Co., 1997, pp. 345-352.

[23] I. M. Vogels, "Detection of temporal delays in visual-haptic interfaces," Human factors: The journal of the Human Factors and Ergonomics society, vol. 46, no. 1, pp. 118-134, 2004.

[24] A. J. Doxon, D. E. Johnson, H. Z. Tan, and W. Provancher, "Human detection and discrimination of tactile repeatability, mechanical backlash, and temporal delay in a combined tactile-kinesthetic haptic display system," Haptics, IEEE Transactions on, vol. 6, no. 4, pp. 453-463, 2013.

[25] A. B. Swanson, I. B. Matey, and G. De Groot, "The strength of the hand," Bull Prosthet Res, vol. 10, no. 14, pp. 145-153, 1970.

[26] M. Turner, D. Gomez, M. Tremblay, and M. Cutkosky, "Preliminary tests of an arm-grounded haptic feedback device in telemanipulation," in Proc. of the ASME Dynamic Systems and Control Division, vol. 64, 1998, pp. 145-149.

[27] H. Z. Tan, X. D. Pang, and N. I. Durlach, "Manual resolution of length, force, and compliance," Advances in Robotics, vol. 42, pp. 13-18, 1992.

[28] C. -H. Ho and M. A. Srinivasan, "Human haptic discrimination of thickness," 1997.

[29] B. Calli, A. Walsman, A. Singh, S. Srinivasa, P. Abbeel, and A. M. Dollar, "Benchmarking in manipulation research: The YCB Object and Model Set and benchmarking protocols," arXiv preprint arXiv:1502.03143, 2015.

[30] Choi, Inrak, Elliot Hawkes, David Christensen, Chris Ploch, and Sean Follmer. "Wolverine: A Wearable Haptic Interface for Grasping in Virtual Reality." In Proceedings of IEEE/RSJ International Conference on Intelligent Robots and Systems (IROS) 2016. IEEE, 2016.

[31] Video of operation of the Wolverine: http://shape.stanford.edu/research/wolverine/.

What is claimed is:

1. An input-output device for simulating a grasping by a hand of an object in a virtual environment, the device comprising:
    a base configured to be mounted on the thumb of the hand; and
    an exoskeleton structure, comprising at least one rod connected to the base, each rod comprising a sliding mount configured to be mounted on a fingertip, such that each rod directly connects the base to the sliding mount,
    wherein the sliding mount comprises a brake configured to lock onto the rod and resist motion of the sliding mount relative to the base, thereby generating a kinesthetic feedback to simulate a real world grasping sensation of the object in the virtual environment.

2. The device of claim 1, wherein the at least one rod is connected to the base by a ball joint with three degrees of freedom.

3. The device of claim 1, wherein the sliding mount is connected to the at least one rod by a cylindrical joint with two degrees of freedom.

4. The device of claim 1, wherein the fingertip is connected to the sliding mount by a revolute joint with one degree of freedom.

5. The device of claim 1, wherein the device comprises three rods connected to the base.

6. The device of claim 1, wherein the device is a mobile wearable haptic device.

7. The device of claim 1, wherein the device comprises at least one geared dc motor and at least one battery.

8. The device of claim 1, wherein the total weight of the device ranges from about 4 gm to about 400 gm.

9. The device of claim 1, wherein the device further comprises one or more sensors mounted on a tip of each rod to measure a position of the rod.

10. The device of claim 9, wherein the one or more sensors is selected from the group consisting of Time-of-Flight sensor, optical encoder, magnetic encoder, linear variable differential transformer, and ultrasonic sensor.

11. The device of claim 1, wherein the device further comprises one or more sensors coupled to the base to measure an overall orientation of the device.

12. The device of claim 11, wherein the one or more sensors is selected from the group consisting of a 9 axis inertial measurement unit (InvenSense MPU9250 with sensor fusion), 6 axis inertial measurement unit, hall effect sensor, optical encoder, and magnetic encoder.

13. The device of claim 1, wherein the device is configured to enable a user to grasp the object in the virtual environment in a precision-based grip as the brake resists a relative motion between the sliding mount on at least one fingertip and the base on the thumb.

14. The device of claim 1, wherein the device is configured to couple to one or more of a virtual reality headset, a controller, and a master controller.

15. The device of claim 14, wherein the coupling is via a wireless connection.

16. A method for simulating a grasping by a hand of an object in a virtual environment, the method comprising:
   installing an input-output device on the hand, the device comprising:
      a base configured to be mounted on the thumb of the hand; and
      an exoskeleton structure, comprising at least one rod connected to the base, each rod comprising a sliding mount configured to be mounted on a fingertip, such that each rod directly connects the base to the sliding mount,
      wherein the sliding mount comprises a brake configured to lock onto the rod and resist motion of the sliding mount relative to the base; and
   grasping the object in the virtual environment, such that the device actuates one or more brakes thereby generating kinesthetic feedback and simulating a real world grasping sensation between the thumb and at least one fingertip.

17. The method of claim 16, wherein a force between the thumb and the at least one fingertip simulates a pad opposition type grasp.

18. The method of claim 17, wherein the force ranges from about 0.05 N to about 500 N.

19. The method of claim 16, wherein a precision grasping motion is generated as the one or more brakes resists a relative motion between the sliding mount on at least one fingertip and the base on the thumb.

20. The method of claim 16, wherein a position of the at least one rod is measured by one or more sensors.

21. The method of claim 16, wherein an orientation of the device is measured by one or more sensors.

22. The method of claim 16, wherein the object is selected from the group consisting of a YCB Object and model Set.

23. The method of claim 16, wherein a shape of the object is selected from the group consisting of tetrahedron, square pyramid, hexagonal pyramid, cube, cuboid, triangular prism, octahedron, pentagonal prism, hexagonal prism, dodecahedron, sphere, ellipsoid, icosahedron, cone and cylinder.

* * * * *